US012682005B2

(12) United States Patent  
George et al.

(10) Patent No.: US 12,682,005 B2  
(45) Date of Patent: Jul. 14, 2026

(54) SYSTEMS AND METHODS FOR AUTOMATIC SEARCH ENGINE OPTIMIZATION OF FUNNEL WEBSITES IN A TIERED SOFTWARE FRAMEWORK

(71) Applicant: HighLevel Inc., Dallas, TX (US)

(72) Inventors: Anish George, Edmonton (CA); Shaun Clark, Eugene, OR (US); Robin Alex, Dallas, TX (US); Varun Vairavan, Doha (QA)

(73) Assignee: Highlevel Inc., Dallas, TX (US)

( * ) Notice: Subject to any disclaimer, the term of this patent is extended or adjusted under 35 U.S.C. 154(b) by 252 days.

(21) Appl. No.: 18/749,809

(22) Filed: Jun. 21, 2024

(65) Prior Publication Data

US 2025/0390546 A1 Dec. 25, 2025

(51) Int. Cl.
| | |
|---|---|
| *G06F 16/958* | (2019.01) |
| *G06F 16/2457* | (2019.01) |
| *G06F 16/953* | (2019.01) |

(52) U.S. Cl.
CPC ...... *G06F 16/958* (2019.01); *G06F 16/24578* (2019.01); *G06F 16/953* (2019.01)

(58) Field of Classification Search
CPC . G06F 16/958; G06F 16/953; G06F 16/24578
See application file for complete search history.

(56) References Cited

U.S. PATENT DOCUMENTS

| | | | | |
|---|---|---|---|---|
| 8,452,748 | B1 * | 5/2013 | Pugh | G06Q 10/101 |
| | | | | 707/706 |
| 9,026,530 | B2 | 5/2015 | Gouyet et al. | |
| 10,198,408 | B1 | 2/2019 | Commisso | |
| 11,314,837 | B2 | 4/2022 | Aviyam et al. | |
| 11,928,175 | B1 | 3/2024 | Lucas | |
| 11,960,820 | B2 | 4/2024 | Druck et al. | |
| 12,406,017 | B1 * | 9/2025 | Khandelwal | G06F 9/547 |
| 2015/0379141 | A1 * | 12/2015 | Stouffer | G06F 16/951 |
| | | | | 707/706 |
| 2019/0026280 | A1 * | 1/2019 | Aviyam | G06F 16/958 |
| 2020/0242170 | A1 * | 7/2020 | Pogrebezky | G06F 16/986 |
| 2025/0045282 | A1 * | 2/2025 | McGovern | G06F 16/24578 |
| 2025/0088716 | A1 * | 3/2025 | Specter | G06F 8/38 |
| 2025/0238655 | A1 * | 7/2025 | D'Aurelio | G06N 3/042 |
| 2026/0030305 | A1 * | 1/2026 | Gillham | G06F 16/24578 |
| 2026/0105108 | A1 * | 4/2026 | Lim | G06F 9/451 |

* cited by examiner

*Primary Examiner* — Alicia M Willoughby
(74) *Attorney, Agent, or Firm* — Aambell PC

(57) ABSTRACT

Embodiments of a method for automatic search engine optimization (SEO) of funnel websites in a tiered software framework comprises: generating at a first tier, a prompt for an artificial intelligence (AI) model to provide recommendations for improving search rankings of a seed website; receiving from the AI model, SEO format recommendations, and SEO content recommendations; generating websites by modifying the seed website according to a unique selection from the SEO format recommendations and the SEO content recommendations; associating each website with a corresponding SEO score based on performance in a web search; ranking and sorting the websites according to the respective SEO scores; generating choices of the ranked websites; providing the choices to a second tier and receiving a selection therefrom for a number of iterations; and deploying, by the funnel website application the final selection at a public universal resource locator.

20 Claims, 12 Drawing Sheets

100

900

RECEIVE WEBSITE CONTENT FROM TIER-2 AND/OR RECOMMENDATIONS FROM TIER-1 ⌐902

GENERATE METATAGS BASED ON RECEIVED DATA ⌐904

SELECT WEBSITE TEMPLATE BASED ON RECEIVED DATA ⌐906

GENERATE WEBPAGES BY PLACING TEXT AND IMAGES IN SELECTED WEBSITE TEMPLATE AND ADDING GENERATED METATAGS ⌐908

COLLATE WEBPAGES INTO WEBSITE ⌐910

Figure 10C:
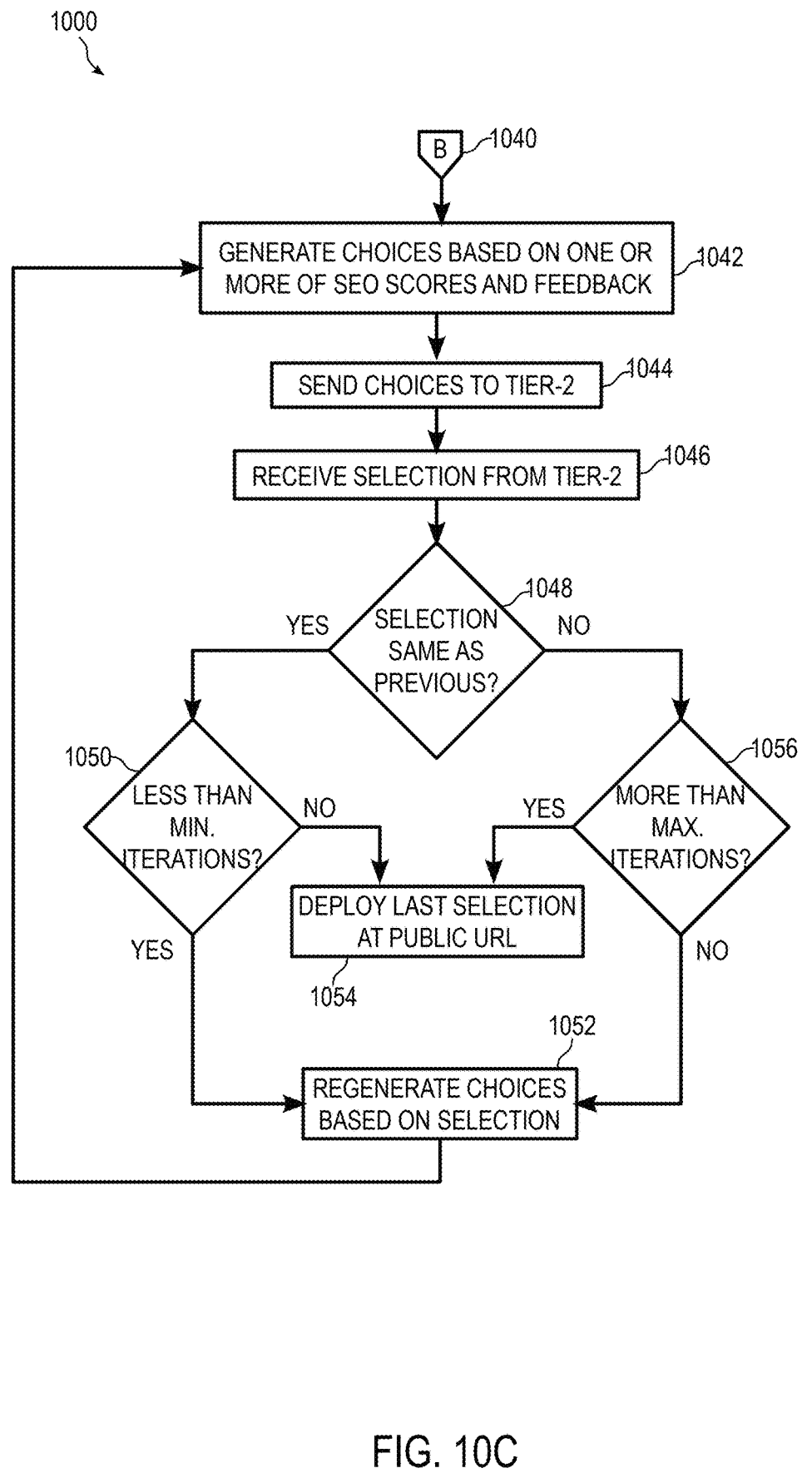

1000

B ─1040

GENERATE CHOICES BASED ON ONE OR MORE OF SEO SCORES AND FEEDBACK ─1042

SEND CHOICES TO TIER-2 ─1044

RECEIVE SELECTION FROM TIER-2 ─1046

SELECTION SAME AS PREVIOUS? ─1048

YES          NO

LESS THAN MIN. ITERATIONS? ─1050

MORE THAN MAX. ITERATIONS? ─1056

NO          YES

DEPLOY LAST SELECTION AT PUBLIC URL
1054

YES          NO

REGENERATE CHOICES BASED ON SELECTION
1052

SYSTEMS AND METHODS FOR AUTOMATIC SEARCH ENGINE OPTIMIZATION OF FUNNEL WEBSITES IN A TIERED SOFTWARE FRAMEWORK

TECHNICAL FIELD

The present disclosure relates to systems, techniques, and methods directed to systems and methods for automatic search engine optimization (SEO) of funnel websites in a tiered software framework.

BACKGROUND

Artificial intelligence (AI) is a growing field in computer science that uses machine learning models to make predictions, recommendations, or classifications based on input data. Revenue from the AI software market worldwide is expected to reach 126 billion dollars by 2025 according to some estimates. In some domains, such as marketing, AI has the potential to significantly impact the delivery of marketing services using behavioral analysis, pattern recognition, and other learning algorithms.

BRIEF DESCRIPTION OF THE DRAWINGS

Embodiments will be readily understood by the following detailed description in conjunction with the accompanying drawings. To facilitate this description, like reference numerals designate like elements. Embodiments are illustrated by way of example, and not by way of limitation, in the figures of the accompanying drawings.

FIGS. 10A-10C are simplified flow diagrams illustrating other example operations associated with the system for automatic SEO of funnel websites, according to some embodiments of the present disclosure.

DETAILED DESCRIPTION

Overview

Figure 1:
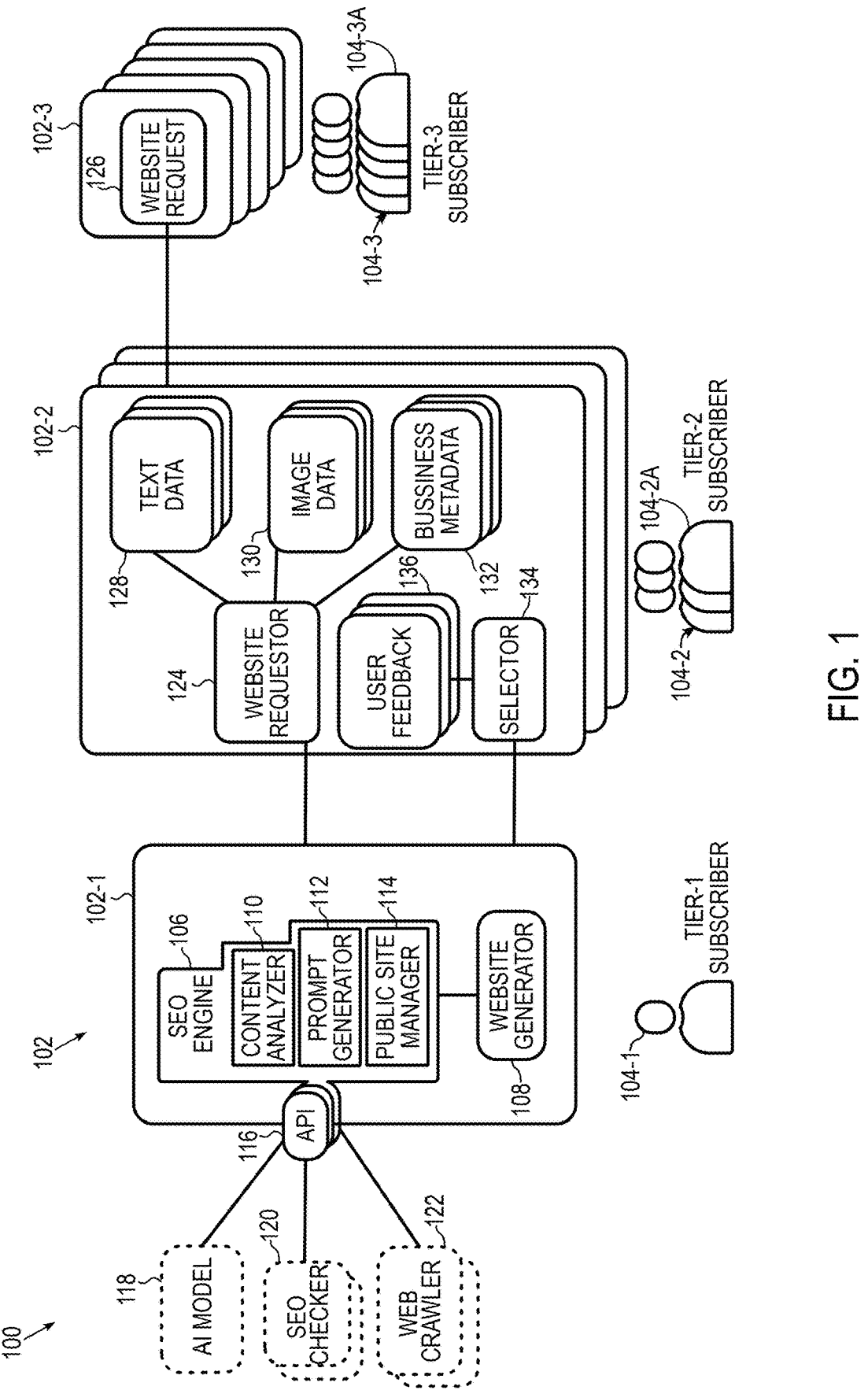
FIG. 1 is a simplified block diagram illustrating an example funnel website application for automatic SEO of funnel websites in a tiered software framework, according to some embodiments of the present disclosure.

For purposes of illustrating the embodiments described herein, it is important to understand certain terminology and operations of technology networks. The following foundational information may be viewed as a basis from which the present disclosure may be properly explained. Such information is offered for purposes of explanation only and, accordingly, should not be construed in any way to limit the broad scope of the present disclosure and its potential applications.

SEO is a process of enhancing a website's visibility and ranking on search engine results to drive organic (i.e., non-paid) traffic. Note that the term "optimization" in SEO is not intended to be mathematical (i.e., principles and methods used to solve quantitative problems); it also does not involve or suggest making something as fully perfect, functional, or effective as possible; it also does not refer to increasing the occurrence of favorable outcomes and decreasing the occurrence of undesirable outcomes. On the other hand, it is merely suggestive of the improvements to search engine rankings from implementing SEO processes (e.g., techniques, operations, strategies). It involves various strategies aimed at improving a website's relevance and authority in mining algorithms used by search engines such as Google™, Bing™, and Yahoo™.

Example aspects of SEO include keyword research, content optimization, and technical optimization. Keyword research involved identifying and strategically incorporating relevant search terms into website content, meta tags, and uniform resource locators (URLs). Content optimization techniques involve creating high-quality, informative, and engaging content that satisfies user intent and aligns with search engine algorithms. Technical optimization ensures that the website is accessible and easily crawlable by search engine bots, with factors like site speed, mobile-friendliness, and secure Hyper Text Transfer Protocol Secure (HTTPS) connections playing crucial roles. In some instances, off-page SEO may also be used, which involves building backlinks from reputable websites, social media engagement, and online reputation management, all of which contribute to a website's authority and credibility. In general, continuous monitoring of SEO performance helps refine strategies and adapt to changing search engine algorithms, ensuring sustained visibility and traffic growth. Effective SEO can boost a website's online presence, attract targeted traffic, and increase conversions, making it a fundamental aspect of digital marketing strategies for businesses of all sizes.

Current techniques for SEO are manual. For example, a human researcher first identifies a target audience for a particular company (e.g., business) whose website is being analyzed for SEO. The researcher identifies relevant keywords and phrases that the target audience is likely to use when searching for the company's products or services. A website, including one or more webpages, is then created by a designer. The keywords and phrases identified by the researcher are incorporated into the webpage's titles, meta descriptions, headers, and content. For an already existing website, a technician fixes broken links, optimizes images, and utilizes schema markup to enhance rich snippets (i.e., search results displaying additional data pulled from structured data found in a webpage's hypertext markup language (HTML) code). A content creator may thereafter regularly publish high-quality, original content that addresses the needs and interests of the target audience, incorporating the identified keywords naturally into the content. In some situations, the company may acquire backlinks from authoritative and relevant websites to increase the authority and credibility of the website, for example, through third-party blogging, partnerships, and networking. Where the targeted audience is local to the location of the company's business, the company may claim and optimize listings in relevant business directories, for example, Google My Business™, and/or obtain local citations, and encourage customer reviews. Social media may be leveraged, for example, by sharing content on social media platforms and backlinking to the company's website. Oftentimes all such manual, time-intensive activities are outsourced to a marketing agency or performed by dedicated marketing teams.

Modern technological advancements in AI have enhanced efficiency of some manual tasks. AI uses machine learning models to make predictions, recommendations, and classifications. In general, machine learning models use algorithms to parse data, learn from the parsed data, and make informed decisions based on what has been learned. According to some classifications, deep learning models are subsets of machine learning models, being machine learning algorithms that operate in multiple layers, creating an artificial neural network. According to some other classifications, machine learning models are those that rely on human intervention to learn, whereas deep learning models automatically learn without human intervention. Because the learning algorithms are more relevant to the disclosure herein than any human intervention to provide training data, the former classification is employed herein, such that wherever "machine learning models" is used, it is intended that deep learning models are included as well.

Deep learning models, in particular, enable AI algorithms such as generative AI models (e.g., ChatGPT™). In a general sense, AI algorithms have three qualities that differentiate them from other algorithms: intentionality, intelligence, and adaptability. As intentional algorithms, they make decisions, often using real-time data, combining information from a variety of different sources, analyzing the combined information instantly, and acting on insights derived from such data. As intelligent algorithms, they are capable of spotting patterns in underlying data. As adaptable algorithms, they learn and adapt their analyses based on shifting input data.

Recent trends in AI technology include commercially available AI engines that expose application programming interfaces (APIs) for other applications to consume. In a general sense, the API is a set of rules and protocols that defines how two software systems may communicate with each other. AI APIs allow advanced AI capabilities of the AI engine to be integrated into applications by allowing the application to make requests to the API and to receive responses. Thus, these applications provide, through the API, data to the AI engine, which runs machine learning models on the data to give suitable results as requested by the applications. Different AI engines may use different machine learning models, thereby providing different results to the same input data. Some AI engines may provide a certain functionality (e.g., text processing only) and some other AI engines may provide a certain other functionality (e.g., image processing only), while some others may provide multiple functionalities (e.g., text, speech, and image processing).

An example arena where AI is being increasingly used is in website building. With the help of AI, AI-based website tools can automatically generate code, create content, and provide design recommendations based on user input. Examples of commercially available website builders using AI include Wix™, Jimdo™, Unbounce™, CodeWP™, Framer™. One such AI-based website tool uses inputs from users, such as selections of the kind of site desired, features needed, information about the user (e.g., name or title of the website, textual blurbs, etc.) and moods (e.g., themes). The website tool typically prompts the user to select a particular design from an array of design choices, and make further selections based on the features, themes and user information displayed. The user may have to add personalized content to the selected choices before being able to deploy the website publicly. Some other website tools may pull certain content like images and business information from third-party links, such as social media sites or Google Business™ listings. Yet other website tools offer standalone templates that are selected by the AI engine, and the user can configure the template appropriately, such as by editing webpage headers, uploading images, updating links, etc. In general, in most of these web building tools using AI, the human user must nevertheless select various features, upload content, configure personalized widgets such as scheduling assistants, and generally tweak the site design.

While many websites typically include static landing webpages with graphics, text and links, some other types of websites may present user experience (UX) flows that require user interaction, and the data generated from the UX flows may be used by the website owner for future marketing purposes. Such websites are termed "funnels" or "funnel websites". In general, a funnel represents a series of UX steps a user takes from becoming aware of a product or service to becoming a paid customer, a process also called converting. In contrast to a static website where traffic arrives and travels randomly, for example, between webpages, links, text, graphics, etc., on a funnel website, traffic flows linearly from a point of entry through a sequence of actions leading to a specific goal (such as becoming a paid customer, signing up for email subscriptions, scheduling a service appointment, etc.). While effective static websites may achieve customer conversion, funnel websites offer greater specificity in terms of their goals and target audience. The funnel website typically has several webpages, each with text, graphics, and at least some webpages in which the user can input information useful for marketing purposes. For example, a sales funnel website may have a "Homepage," an "About" webpage, a "Sign up/Login" webpage, a "Pricing" webpage, a "Help/Support" webpage and a "Products" webpage with information about products configured in a manner to increase sales, such as by inducing a visitor to click on a "Buy Now" button and purchase a product from the website.

AI engines can assist in generating funnels from lead generation to lead nurturing to conversion, helping marketers improve their strategy and streamline their processes. Typical AI tools for funnel building generate forms (e.g., quizzes), capture email addresses, and send targeted emails automatically. Some AI tools can perform custom copywriting, insert product images and graphics and generate a professional webpage in much less time than it would take a human operator. Some AI engines leverage natural language processing (NLP) to generate effective sales copy and content with a simple prompt from the user, enabling personalized content for different customers. AI engines are also used to analyze data from websites and optimize sales funnels.

In theory, AI can optimize sales funnel websites by using past data. For example, the AI engine can pre-qualify prospects based on a visitor's past browsing behavior on the funnel website. In another example, the AI engine may automatically scour Internet forums and social media to identify if a visitor to the funnel website is shopping actively or merely window shopping. However, in practice, the effectiveness of AI models is only as good as the learning data they have access to. In standalone applications with website funnel building tools using AI that are offered to different businesses, the AI engine is separate from the business, which is the website owner. Therefore, it may not have access to the outcome of the funnel website that it has built for the business, for example, the actual conversion rate of the funnel website. Thus, it may not be able to effectively optimize future funnels based on past experience. Even in instances where a website owner of a particular business has its own AI engine-based funnel website application, the AI engine has access only to the websites created for that business and may not be able to leverage any learning data from other funnel websites of different businesses.

When it comes to SEO for the funnel website, the limitations can be compounded, as incorporating SEO recommendations from SEO audit tools is a manual process, requiring human intervention for obtaining meaningful results. Example features of most SEO audit tools include: tracking search statistics, such as keyword rankings and impact of changes to the website on search engine rankings; generating and customizing the robots.txt file, which is a text file following Robots Exclusion Protocol that specifies rules for web crawlers, such as which directories or webpages should not be crawled, which ones can be crawled, the frequency of crawling, etc.; spotting SEO issues on webpages and providing recommendations for fixing them; generating schema markup (e.g., structured data) to help search engines better understand the content of the webpages, for example, by creating a vocabulary of tags as defined by the Schema.org collaborative organization to describe various types of content such as articles, events, businesses, products, reviews, etc.; managing links and/or redirects within webpages to eliminate redirect errors; automating links between webpages on the website; auditing outbound links; and generating an overview of search and social snippets.

According to currently existing technology, such SEO audit tools are merely analysis tools to aid a human web designer who then incorporates the recommendations from these SEO audit tools appropriately. The web designer takes into consideration various other factors that the SEO audit tools cannot comprehend or are irrelevant for SEO analysis, such as preferences of individual website owners, or actual conversion rates from previous funnel websites. Besides, current AI-based SEO audit tools cannot output content that is ready to be published right away. For example, AI-generated content can lead to keyword stuffing, which results in poor human readability and negative customer experience. Therefore, AI-generated content must be reviewed by a human to ensure quality and accuracy.

In contrast, according to embodiments disclosed herein, a method for automatically generating funnel websites optimized for search engines in a tiered software framework comprising at least a first tier and a second tier is disclosed. A seed website with one or more webpages is automatically generated at the first tier in the tiered software framework using data provided by the second tier. A prompt is automatically generated from the seed website. The prompt is consumed by an AI model which provides SEO recommendations for improving search rankings of the seed website in response to the prompt. A plurality of websites is automatically generated, each website created by modifying the seed website according to the SEO recommendations. Each website is then automatically deployed at a suitable URL and sent to a SEO checker and/or web crawler for feedback, for example, an SEO score based on its performance in a web search or indexing by a web crawler. The websites are ranked and sorted according to the respective SEO scores. A subset in the plurality of websites is then selected as choices based on the ranking and sorting and provided to the second tier in the tiered software framework. In response to receiving a selection to the choices from the second tier, another set of choices is generated, with the selection by the second tier included in the choices. This process is repeated for a predetermined number of iterations, or a consistent selection over many iterations is obtained. The website selected in the final iteration is then automatically deployed at a public URL.

In another embodiment, a plurality of tiers may be provided in a software framework. Data in a first tier may be accessible at the first tier and inaccessible at a second tier and a third tier, data in the second tier may be accessible at the first tier and the second tier and inaccessible at the third tier, and data in the third tier may be accessible at the first tier, the second tier and the third tier. A website generator at the first tier may automatically generate a seed website based on website content provided by the second tier. An AI engine may provide SEO recommendations for enhancing the search rankings of the seed website. The website generator may modify the seed website according to the SEO recommendations and generate a plurality of websites. These websites may be fed to a SEO checker and/or web crawler for feedback. The SEO feedback received may inform ranking of the websites. The ranked choices are provided to the second tier, and a selection by the second tier is deployed automatically at a public URL.

In the following detailed description, various aspects of the illustrative implementations may be described using terms commonly employed by those skilled in the art to convey the substance of their work to others skilled in the art.

The term "connected" means a direct connection (which may be one or more of a communication, mechanical, and/or electrical connection) between the things that are connected, without any intermediary devices, while the term "coupled" means either a direct connection between the things that are connected, or an indirect connection through one or more passive or active intermediary devices.

The term "computing device" means a server, a desktop computer, a laptop computer, a smartphone, or any device with a microprocessor, such as a central processing unit (CPU), general processing unit (GPU), or other such electronic component capable of executing processes of a software algorithm (such as a software program, code, application, macro, etc.).

The term "cloud network" means a network of computing devices coupled together in a public, private, or hybrid communications network. Communication in the cloud network may use one or more wired, wireless, broadband, radio, and other kinds of communicative means. The Internet is an example of a cloud network.

As used herein, the term "application" can be inclusive of an executable file comprising instructions that can be understood and processed on a computing device such as a computer, and may further include library modules loaded during execution, object files, system files, hardware logic, software logic, or any other executable modules. Applications are generally configured to perform particular tasks, or functions according to the type of application.

As used herein, the term "image" refers to static images (e.g., illustrations, pictures, photos, icons, backgrounds, etc.), and moving images (e.g., videos, GIFs, etc.). In some instances, an image may be more specifically described, for example, as an icon, or photo, or video, without limiting to such specific descriptions. Thus, where an icon is described, the embodiments herein contemplate that any other kind of image may be substituted therewith without departing from the scope of the corresponding embodiment.

As used herein, the term "metadata" in any webpage refers to any information that is not immediately apparent or visible to a reader or viewer of a website and/or contains description or context about the data in the webpage. Examples include hyperlinks, formatting designations (e.g., designating certain text as title, or heading, or body, etc.), hidden text (e.g., webpage description), robots instructions (e.g., informing web crawlers whether to index the webpage), view port settings (e.g., display surface of a webpage), structured schema, etc. Metadata can include code that informs search engines about relevant information about a webpage (e.g., manner of display of the webpage in search results), code that informs web browsers about how to display the webpage to visitors, etc.

The description uses the phrases "in an embodiment" or "in embodiments," which may each refer to one or more of the same or different embodiments.

Although certain elements may be referred to in the singular herein, such elements may include multiple sub-elements. For example, "a computing device" may include one or more computing devices.

Unless otherwise specified, the use of the ordinal adjectives "first," "second," and "third," etc., to describe a common object, merely indicate that different instances of like objects are being referred to and are not intended to imply that the objects so described must be in a given sequence, either temporally, spatially, in ranking or in any other manner.

In the following detailed description, reference is made to the accompanying drawings that form a part hereof, and in which is shown, by way of illustration, embodiments that may be practiced. It is to be understood that other embodiments may be utilized, and structural or logical changes may be made without departing from the scope of the present disclosure. Therefore, the following detailed description is not to be taken in a limiting sense.

The accompanying drawings are not necessarily drawn to scale. In the drawings, same reference numerals refer to the same or analogous elements shown so that, unless stated otherwise, explanations of an element with a given reference numeral provided in context of one of the drawings are applicable to other drawings where element with the same reference numerals may be illustrated. Further, the singular and plural forms of the labels may be used with reference numerals to denote a single one and multiple ones respectively of the same or analogous type, species, or class of element.

Note that in the figures, various components are shown as aligned, adjacent, or physically proximate merely for ease of illustration; in actuality, some or all of them may be spatially distant from each other. In addition, there may be other components, such as routers, switches, antennas, communication devices, etc. in the networks disclosed that are not shown in the figures to prevent cluttering. Systems and networks described herein may include, in addition to the elements described, other components and services, including network management and access software, connectivity services, routing services, firewall services, load balancing services, content delivery networks, virtual private networks, etc. Further, the figures are intended to show relative arrangements of the components within their systems, and, in general, such systems may include other components that are not illustrated (e.g., various electronic components related to communications functionality, electrical connectivity, etc.).

In the drawings, a particular number and arrangement of structures and components are presented for illustrative purposes and any desired number or arrangement of such structures and components may be present in various embodiments. Further, unless otherwise specified, the structures shown in the figures may take any suitable form or shape according to various design considerations, manufacturing processes, and other criteria beyond the scope of the present disclosure.

Figure 10A:
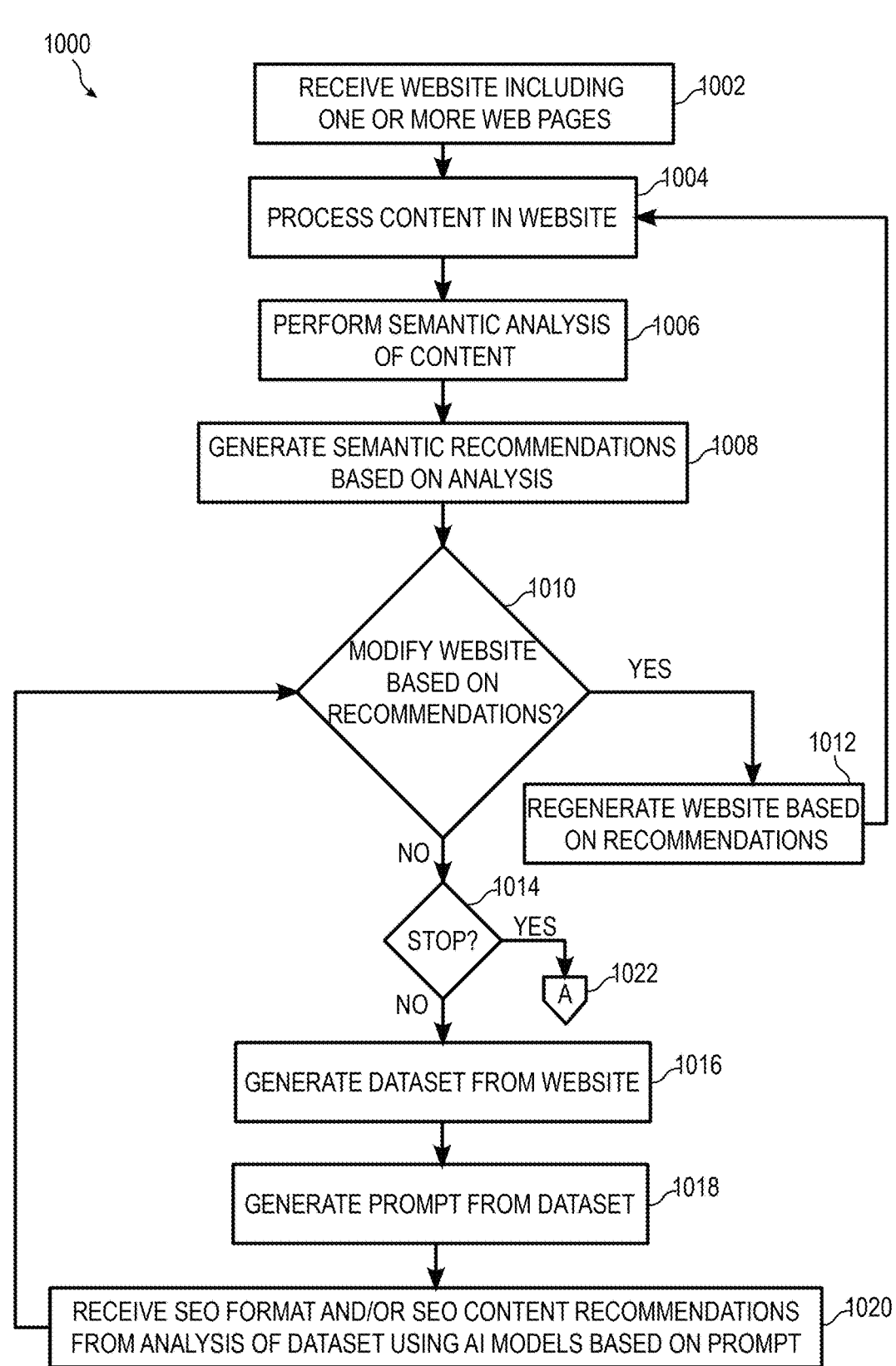
Figure 10B:
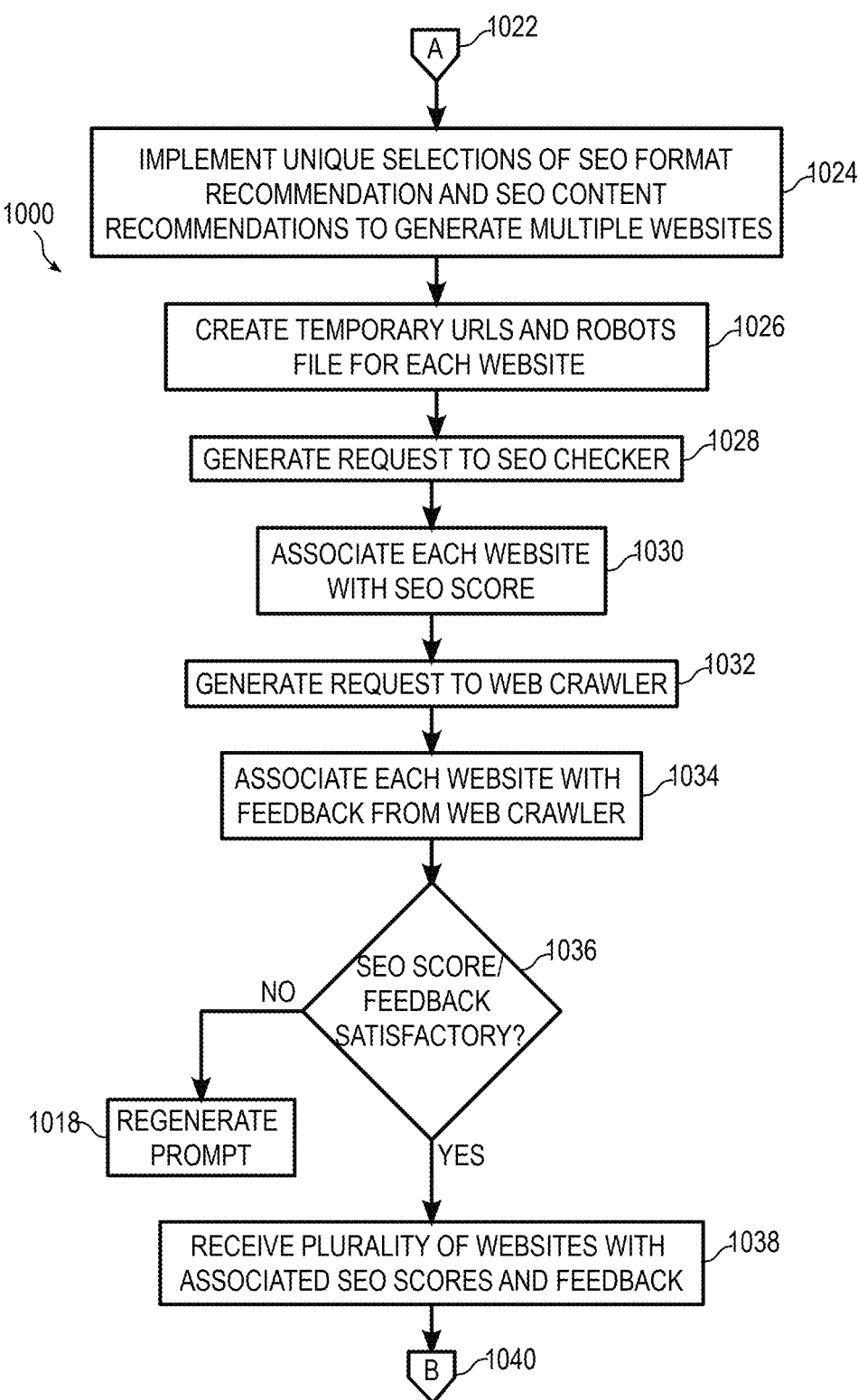

For convenience, if a collection of drawings designated with different letters are present (e.g., FIGS. 10A-10C), such a collection may be referred to herein without the letters (e.g., as "FIG. 10"). Similarly, if a collection of reference numerals designated with different letters are present (e.g., 106a, 106b), such a collection may be referred to herein without the letters (e.g., as "106") and individual ones in the collection may be referred to herein with the letters. Further, labels in upper case in the figures (e.g., 106A) may be written using lower case in the description herein (e.g., 106a) and should be construed as referring to the same elements.

Various operations may be described as multiple discrete actions or operations in turn in a manner that is most helpful in understanding the claimed subject matter. However, the order of description should not be construed as to imply that these operations are necessarily order dependent. In particular, these operations may not be performed in the order of presentation. Operations described may be performed in a different order from the described embodiment. Various additional operations may be performed, and/or described operations may be omitted in additional embodiments.

EXAMPLE EMBODIMENTS

FIG. 1 is a simplified block diagram illustrating an example funnel website application 100 according to embodiments of the present disclosure. Funnel website application 100 may comprise various tiers 102. In the example shown, funnel website application 100 has three tiers: 102-1, 102-2, and 102-3. Note that the labeling convention followed herein uses the hyphen followed by a number to denote a separate tier corresponding to the number (e.g., "-1" denotes tier-1, "-2" denotes tier-2, and "-3" denotes tier-3). Tiers 102 may be accessed by subscribers 104 according to access credentials based on their respective tiers 102. For example, subscribers 104-1 may have access to tiers 102-1, 102-2, and 102-3; subscribers 104-2 may have access to tiers 102-2 and 102-3; and subscribers 104-3 may have access only to tier 102-3.

Tiers 102 may be organized according to a hierarchy of management (i.e., to oversee, to control, to maintain), with upstream tiers managing downstream ones. Thus, tier 102-1 comprises operations that may manage tiers 102-2 and 102-3, whereas tier 102-2 comprises operations that may manage tier 102-3 but not tier 102-1. For purposes of terminology, tier 102-1 is "upstream" relative to tiers 102-2 and 102-3; tier 102-3 is "downstream" relative to tiers 102-2 and 102-1; tier 102-2 is downstream relative to tier 102-1 and upstream relative to tier 102-3. In some embodiments, each tier 102 may interact with the tier immediately adjacent thereto (e.g., downstream or upstream) but not with non-adjacent tiers. In some other embodiments, any tier 102 may interact with any other tier. In an example embodiment, tier 102-3 comprises marketing activities by business locations such as a dentist's office, a plumber's business, etc.; tier 102-2 comprises software operations by one or marketing agencies whose customers are the business locations of tier 102-3; and tier 102-1 comprises software operations by subscriber 104-1 whose customers are the marketing agencies of tier 102-2.

Funnel website application 100 may be managed by subscriber 104-1 providing one or more downstream subscribers 104-2 at tier 102-2 with access to certain functionalities of funnel website application 100. In turn, subscriber 104-2 may provide one or more downstream subscriber 104-3 at tier 102-3 with access to certain other functionalities of funnel website application 100. In various examples, the functionalities available to subscribers 104-1 may not be the same as those available to subscribers 104-2, which may be different from those available to subscribers 104-3. Subscribers 104 (e.g., 104-1, 104-2 and 104-2) may include an entity (i.e., a company, an organization, etc.) in various embodiments. In an example embodiment, subscribers 104-1 may be software-as-a-service (SaaS) providers, subscribers 104-2 may comprise marketing agencies, and subscribers 104-3 may comprise individual businesses, such as plumbers, dentists, pet stores, etc.

Human users at subscribers 104 may operate or otherwise use funnel website application 100 through one or more devices such as computers, laptops, smartphones, mobile computing devices, mobile phones, iPads™, Google Droids™, Microsoft® Surface™, etc. In various embodiments, a single subscriber 104-1 may have multiple subscribers 104-2 at tier 102-2; a single subscriber 104-2 at tier 102-2 may have multiple subscribers 104-3 at tier 102-3. Each subscriber 104-2 may have an account with one subscriber 104-1 at tier 102-1; each subscriber 104-3 may have an account with one subscriber 104-2 at tier 102-2. In other words, there may be a one-to-many relationship downstream (e.g., from tier-1 to tier-2 to tier-3), and a one-to-one relationship upstream (e.g., from tier-3 to tier-2 to tier-1).

In various embodiments, funnel website application 100 may include an SEO engine 106 and a website generator 108 at tier 102-1. SEO engine 106 may include a content analyzer 110 for analyzing webpages generated by website generator 108. Website generator 108 may generate a funnel website (also termed simply as "website" herein) comprising one or more webpages. SEO engine 106 may comprise a prompt generator 112 for generating prompts from the webpages generated by website generator 108, a public site manager 114 for managing various test websites to be deployed privately for SEO optimization and various application programming interfaces (APIs) 116 for interfacing with external or third-party tools. By "external tools" or "third-party tools" are meant software systems, mathematical models, algorithms, and/or software engines out of the control of funnel website application 100. In other words, funnel website application 100 may provide inputs to such external or third-party tools, and obtain results responsive to the inputs therefrom, but cannot modify or otherwise influence the internal processes thereof. The third-party tools may include, by way of examples, and not as limitations, one or more AI model 118, SEO checker 120, and web crawler 122. In various embodiments, AI model 118 may be exposed to API 116 by a third-party NLP AI engine such as OpenAI™, Gemini™, etc. SEO checker 120 may be any third-party engine that provides SEO scores and sub-scores according to desired categories, such as meta-information, webpage quality, webpage structure, link structure, server configuration, etc. Web crawler 122 may be any third-party crawler, spider or spider-bot algorithm such as Googlebot™ that systematically browses the Internet and indexes websites for search engines.

In various embodiments, funnel website application 100 may include a website requestor 124 executing in tier 102-2. Note that website requestor 124 may be associated with a particular one of tier-2 subscribers 104-2, say 104-2a. Note also that the labeling convention followed herein uses letters to denote a separate instance of the same component (e.g., "a" denotes instance A, "b" denotes instance B, and so on). Other tier-2 subscribers 104-2, say 104-2b and 104-2c, may be associated with other instances of website requestor 124. Website requestor 124 may be configured to send a request to tier 102-1 for generating a website. In some embodiments, website requestor 124 may send the request to tier 102-1 in response to a website request 126 from one of subscribers 104-3 at tier 102-3. For example, the particular tier-3 subscriber 104-3a may be dentistry business, and subscriber 104-2a may be a marketing agency whose customer is the dentistry business. Website request 126 may be sent by a human user of subscriber 104-3a requesting subscriber 104-2a to create a website for the dentistry business as part of a marketing strategy. In some examples, website request 126 may be sent by clicking an appropriate button on a user interface of funnel website application 100; in other examples, website request 126 may be sent via email, short message service (SMS) text messages, chat messages and/or other forms of communication within funnel website application 100, or external to funnel website application 100.

In some other embodiments, website requestor 124 may send the request to tier 102-1 based on configuration settings at tier 102-2 associated with the particular one of subscriber 104-3 without receiving website request 126. In some examples, the configuration settings may specify that the request for generating the website be sent to tier 102-1 after appropriate information has been provided by subscriber 104-3, such as the type of the business, name of the business, details of the business, geographic locations, currently ongoing deals and discounts, and other such information. In some other examples, such information may be provided at the time of subscribing to the respective account at tier 102-3; in yet other examples, such information may be provided upon request. In yet other examples, the information may be gathered across various time periods, and the website request sent to tier 102-1 when all predetermined categories of information have been collected and stored at tier 102-2. Various such scenarios are contemplated within the broad scope of the embodiments described herein.

Examples of information used in generating the website include text data 128; image data 130; and business meta-data 132, all of which belong to or are associated with a particular one of tier-3 subscriber 104-3, for example, 104-3a. Text data 128 may include any textual data that may be publicly displayed on the website, such as name of the business, descriptive content, legal terms, and such other information. Image data 130 may include static and/or moving images for display on the website. Business metadata 132 may include user preferences, such as indexing, formatting, display, etc. settings specific to subscriber 104-3a. The data comprised in text data 128, image data 130 and business metadata 132 may include a portion of business information of tier-3 subscriber 104-3a. Such business information includes business name, business category, business address and contact information, business location, business market niche, business size, business revenue, business marketing processes, business social media accounts, product/service descriptions, store timings, customer demographics, customer preferences, customer behavior, business trends, customer trends, and such other information that is useful and relevant for generating funnel websites. In various examples, data associated with each tier-3 subscriber 104-3 may be segregated from data of other tier-3 subscribers 104-3 at tier 102-2. In some examples, the data may be stored at respective accounts in tier 102-3 and retrieved for temporary (e.g., transient) storage in tier 102-2 upon receiving tier-3 website request 126.

In various examples, funnel website application 100 may include a selector 134 executing in tier 102-2. Selector 134 may select from among a plurality of website choices provided by tier 102-1. In some examples, selector 134 may use user feedback 136 to make the selection. In some embodiments, user feedback 136 may be limited to user feedback from previous websites of the particular tier-3 subscriber 104-3a; in other embodiments, user feedback 136 may comprise user feedback from all or a subset of websites generated for tier-3 subscribers 104-3 of tier-2 subscriber 104-2a. In yet other embodiments, user feedback 136 may comprise user feedback from all or a subset of websites generated for tier-3 subscribers 104-3 of all or a subset of tier-2 subscribers 104-2.

During operation, a particular tier-3 subscriber, say 104-3a, may submit website request 126 to tier-2 subscriber, say 104-2a. Responsive to tier-3 website request 126, website requestor 124 may collate data from text data 128, image data 130 and business metadata 132 and send the request including such website content to website generator 108. Website generator 108 may create a seed website, which may be analyzed by SEO engine 106. Thereafter, a prompt may be sent to one or more AI model 118 through appropriate API 116 for recommendations to improve search engine rankings of the seed website. The recommendations provided by one or more AI model 118 may be implemented by website generator 108 to generate a plurality of websites from the seed website. The plurality of websites may be deployed at suitable URLs and provided to one or more SEO checker 120 and/or web crawler 122 to gather feedback therefrom. Feedback from SEO checker 120 may be in the form of SEO scores; feedback from web crawler 122 may be in the form of indexing data. The feedback may be used by website generator 108 to rank the plurality of websites. The ranked websites may be provided as choices in one or more iterations to selector 134. Selector 134 may make a selection based on user feedback 136 or actual human input, say from a user of tier-3 subscriber 104-3a. After a suitable selection has been finalized, website generator 108 may deploy the website publicly. Such SEO processes may be performed without human intervention in some examples, with minimal human intervention in other examples, with minimal design experience or SEO experience by a human user in yet other examples, to automatically create funnel websites optimized for higher search engine rankings.

Figure 2:
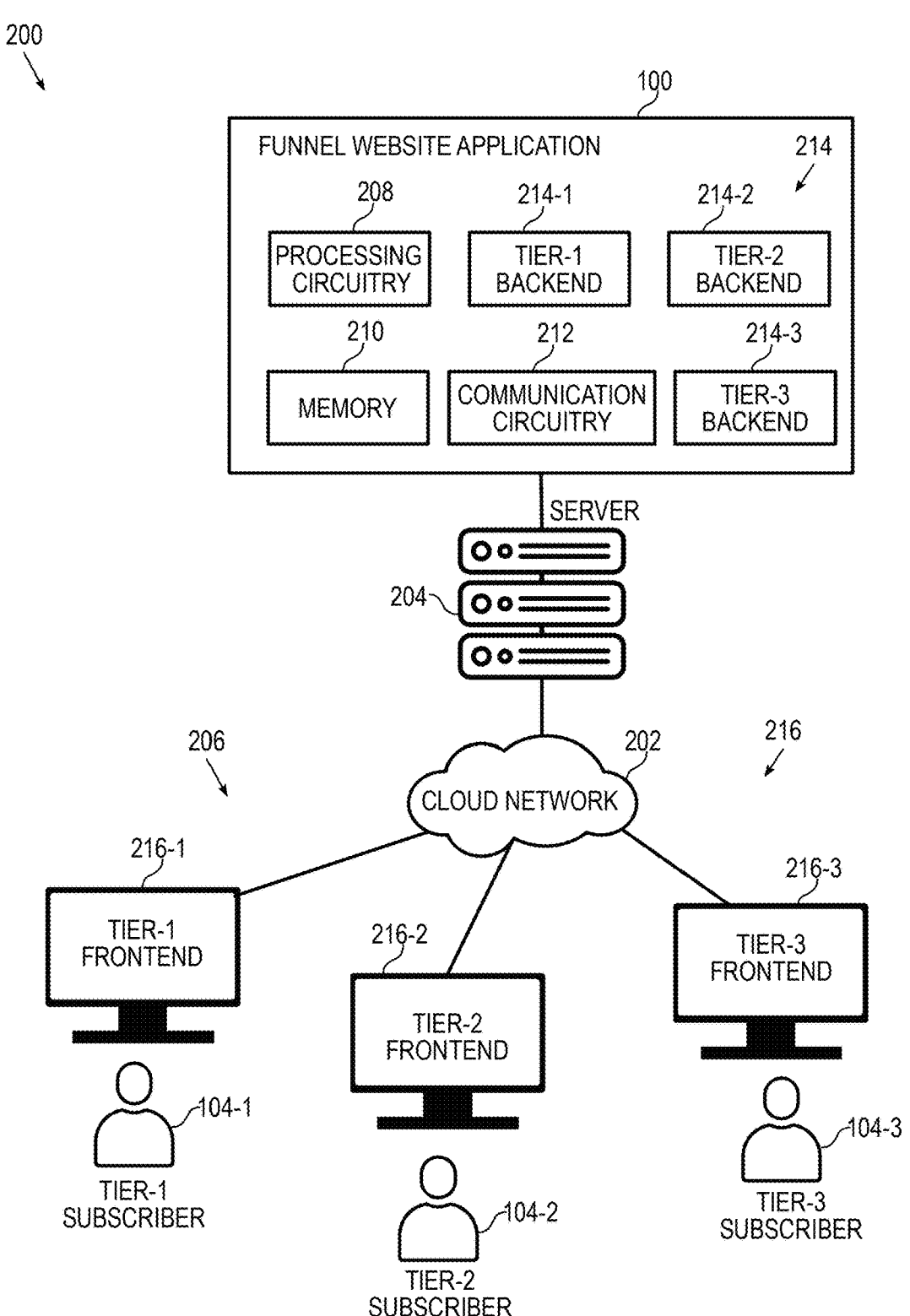
FIG. 2 is a simplified block diagram illustrating example details of the tiered software framework implementing the systems and methods for automatic SEO of funnel websites, according to some embodiments of the present disclosure.

FIG. 2 is a simplified block diagram illustrating a tiered software framework 200 according to various embodiments. In example implementations, at least some portions of the activities outlined herein may be hosted on a cloud network 202 in one or more servers 204. At least some other portions of the activities outlined herein may be implemented in one or more computing devices 206 connected over one or more communication networks with cloud network 202. In particular embodiments, cloud network 202 is a collection of hardware devices and executable software forming a shared pool of configurable computing resources (e.g., networks, servers, storage, applications, services, etc.) that may be suitably provisioned to provide on-demand self-service, network access, resource pooling, elasticity and measured service, among other features. Computing device 206 may have any desired form factor, such as a handheld or mobile computing device (e.g., a cell phone, a smart phone, a mobile Internet device, a tablet computer, a laptop computer, a netbook computer, an ultra-book computer, a Personal Digital Assistant (PDA), an ultramobile personal computer, etc.), a desktop computing device, a server or other networked computing component, a set-top box, an entertainment control unit, or a wearable computing device.

Certain portions of tiered software framework 200 (e.g., funnel website application 100) may execute using a processing circuitry 208, a memory 210 and communication circuitry 212 (among other components) in one or more servers 204. Certain other portions of tiered software framework 200 may execute in one or more computing devices 206 using respective processing circuitry, memory, and communication circuitry (not shown with particularity so as not to clutter the drawing) substantially similar in functionalities to processing circuitry 208, memory 210 and communication circuitry 212. In some embodiments, one or more of these features may be implemented in hardware, provided external to these elements, or consolidated in any appropriate manner to achieve the intended functionality. The various network elements in tiered software framework 200 may include communication software that can coordinate to achieve the operations as outlined herein. In still other embodiments, these elements may include any suitable algorithms, hardware, software, components, modules, interfaces, or objects that facilitate the operations thereof.

Processing circuitry 208 may execute any type of instructions associated with data stored in memory 210 to achieve the operations detailed herein. In one example, processing circuitry 208 may transform data from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., field programmable gate array (FPGA), an erasable programmable read only memory (EPROM), an application specific integrated circuit (ASIC)) that includes digital logic, software, code, electronic instructions, flash memory, optical disks, magnetic or optical cards, other types of machine-readable mediums suitable for storing electronic instructions, or any suitable combination thereof.

In some of example embodiments, one or more memory 210 may store data used for the operations described herein. This includes memory 210 storing instructions (e.g., software, logic, code, etc.) in non-transitory media (e.g., random access memory (RAM), read only memory (ROM), FPGA, EPROM, etc.) such that the instructions are executed to carry out the activities described in this disclosure based on particular needs. In some embodiments, memory 210 may comprise non-transitory computer-readable media, including one or more memory devices such as volatile memory such as dynamic RAM (DRAM), nonvolatile memory (e.g., ROM), flash memory, solid-state memory, and/or a hard drive. In some embodiments, memory 210 may share a die with processing circuitry 208. Memory 210 may include algorithms, code, software modules, and applications, which may be executed by processing circuitry 208. The data being tracked, sent, received, or stored in tiered software framework 200 may be provided in any database, register, table, cache, queue, control list, or storage structure, based on particular needs and implementations, all of which could be referenced in any suitable timeframe.

Communication circuitry 212 may be configured for managing wired or wireless communications for the transfer of data in tiered software framework 200. The term "wireless" and its derivatives may be used to describe circuits, devices, systems, methods, techniques, communications channels, etc., that may communicate data through modulated electromagnetic radiation in a nonsolid medium. The term does not imply that the associated devices do not contain any wires, although in some embodiments they might not. Communication circuitry 212 may implement any of a number of wireless standards or protocols, including but not limited to Institute for Electrical and Electronic Engineers (IEEE) standards including Wi-Fi (IEEE 802.11 family), IEEE 802.16 standards (e.g., IEEE 802.16-2005 Amendment), Long Term Evolution (LTE) project along with any amendments, updates, and/or revisions (e.g., advanced LTE project, ultramobile broadband (UMB) project (also referred to as "3GPP2"), etc.). Communication circuitry 212 may operate in accordance with a Global System for Mobile Communication (GSM), General Packet Radio Service (GPRS), Universal Mobile Telecommunications System (UMTS), High-Speed Packet Access (HSPA), Evolved HSPA (E-HSPA), or LTE network. Communication circuitry 212 may operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). Communication circuitry 212 may operate in accordance with Code Division Multiple Access (CDMA), Time Division Multiple Access (TDMA), Digital Enhanced Cordless Telecommunications (DECT), Evolution-Data Optimized (EV-DO), and derivatives thereof, as well as any other wireless protocols that are designated as 3G, 4G, 5G, and beyond. Communication circuitry 212 may operate in accordance with other wireless protocols in other embodiments. Communication circuitry 212 may include antennas to facilitate wireless communications and/or to receive other wireless communications.

In some embodiments, communication circuitry 212 may manage wired communications, such as electrical, optical, or any other suitable communication protocols (e.g., the Ethernet, Internet). Communication circuitry 212 may include multiple communication chips. For instance, a first communication chip may be dedicated to shorter-range wireless communications such as Wi-Fi or Bluetooth, and a second communication chip may be dedicated to longer-range wireless communications such as global positioning system (GPS), EDGE, GPRS, CDMA, WiMAX, LTE, EV-DO, or others. In some embodiments, a first communication chip may be dedicated to wireless communications, and a second communication chip may be dedicated to wired communications.

The example network environment may be configured over a physical infrastructure that may include one or more networks and, further, may be configured in any form including, but not limited to, local area networks (LANs), wireless local area networks (WLANs), virtual local area networks (VLANs), metropolitan area networks (MANs), wide area networks (WANs), virtual private networks (VPNs), Intranet, Extranet, any other appropriate architecture or system, or any combination thereof that facilitates communications in a network. In some embodiments, a communication link may represent any electronic link supporting a LAN environment such as, for example, cable, Ethernet, wireless technologies (e.g., IEEE 802.11x), ATM, fiber optics, etc. or any suitable combination thereof. In other embodiments, communication links may represent a remote connection through any appropriate medium (e.g., digital subscriber lines (DSL), telephone lines, T1 lines, T3 lines, wireless, satellite, fiber optics, cable, Ethernet, etc. or any combination thereof) and/or through any additional networks such as a WANs (e.g., the Internet).

In various embodiments, tiers 102 may be partitioned into a backend 214 and a frontend 216. Backend 214 may comprise tier-1 backend 214-1, tier-2 backend 214-2, and tier-3 backend 214-3 provisioned in one or more servers 204. Likewise, frontend 216 may comprise tier-1 frontend 216-1, tier-2 frontend 216-2, and tier-3 frontend 216-3 provisioned in one or more computing devices 206. Backend 214 may comprise various modules, logic, software engines and other components that are distributed (and common) across all users of tiered software framework 200. Backend 214 may execute operations for managing and processing data, performing computations, and facilitating communication between different components, such as components of funnel website application 100. In particular embodiments, backend 214 may include operations such as data management, business logic (e.g., funnel website application 100), user authentication and authorization, security and validation, APIs with third-party components such as web crawlers, payment processors, etc.

In a general sense, frontend 216 comprises at least a user interface using which human users interact with tiered software framework 200. Frontend 216 may also include libraries, forms, device integrators and other components as desired and based on particular needs. Frontend 216 may be presented on a suitable display device coupled to computing device 206 and appropriate to show visual indicators, such as a heads-up display, a computer monitor, a projector, a touchscreen display, a liquid crystal display (LCD), a light-emitting diode display, and/or a flat panel display. In various embodiments, frontend 216 may be specific to the particular one of tier 102. For example, frontend 216-1 at tier-1 may comprise certain functionalities available (and visible) only to subscriber 104-1, e.g., SaaS provider, software developer. Frontend 216-2 at tier-2 may comprise certain functionalities available (and visible) only to tier-2 subscriber 104-2. Frontend 216-3 at tier-3 may comprise certain functionalities available (and visible) only to tier-3 subscriber 104-3.

Tiered software framework 200 described and shown herein (and/or its associated structures) may also include suitable interfaces for receiving, transmitting, and/or otherwise communicating data or information in a network environment. In a general sense, the arrangements depicted in the figures may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

Figure 3:
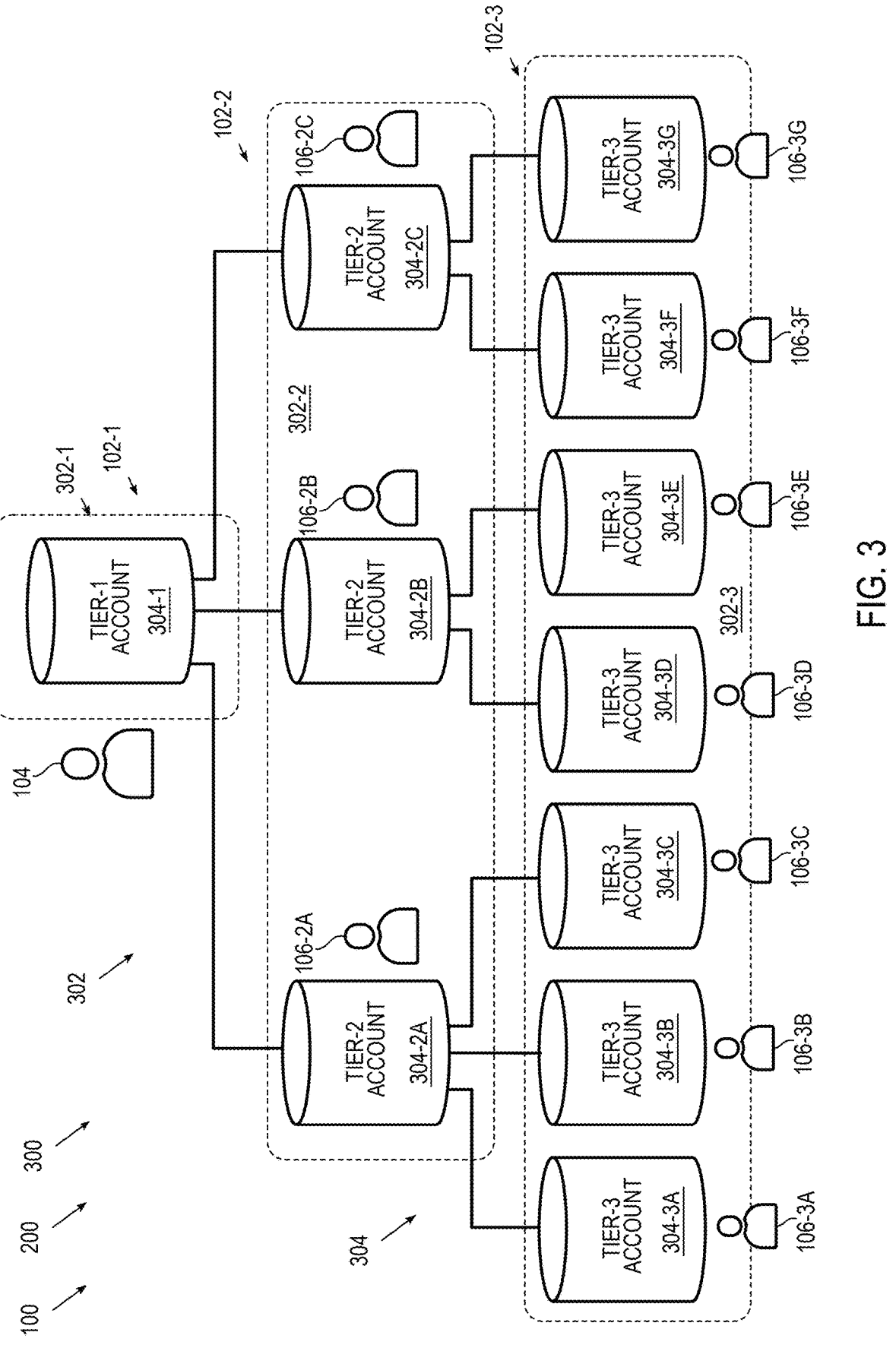
FIG. 3 is a simplified block diagram illustrating other example details of the tiered software framework implementing the systems and methods for building funnel websites using AI, according to some embodiments of the present disclosure.

FIG. 3 is a simplified block diagram illustrating example details of data hierarchy 300 of tiered software framework 200 implementing funnel website application 100, according to some embodiments of the present disclosure. In various embodiments, data 302 communicated in tiered software framework 200 may be exclusively received from users such as subscriber 104-1 and subscribers 104-2, and 104-3; in some other embodiments, data 302 may also be received from other sources, such as third parties and/or from the Internet. Examples of data 302 include business niche targeted by subscribers 104, marketing activities such as on social media, target audience of subscribers 104, login credentials to access various marketing platforms, frequency of marketing activities, information to be included in the content of marketing posts, customer lists, business locations, marketing platform rules, and other such data relevant to the functionalities offered by tiered software framework 200. Data 302 may be stored in data lakes, databases, data warehouses, blockchains, file systems and other types of data storage facilities within the broad scope of the embodiments with corresponding accessing and viewing capabilities as described herein. In various embodiments, text data 128, image data 130, and business metadata 132 may be subsets of data 302.

Data 302 in each tier 102 may be contained within accounts 304 accessible and viewable with appropriate access credentials. For example, account 304-1 may be associated with subscriber 104-1. Account 304-1 may manage a plurality of accounts 304-2 at tier 102-2. Subscriber 104-2a may have a subscription to account 304-2a in plurality of accounts 304-2. Account 304-2a may manage a plurality of accounts 304-3 at tier 102-3. Subscriber 104-3a may have a subscription to account 304-3a in plurality of accounts 304-3; subscriber 104-3b may have a subscription to account 304-3b in plurality of accounts 304-3; and subscriber 104-3c may have a subscription to account 304-3c in plurality of accounts 304-3. In other words, subscriber 104-2a has three downstream subscribers at tier 102-3, namely subscribers 104-3a, 104-3b, and 104-3c with their associated respective accounts 304-3a, 304-3b, and 304-3c. Likewise for other accounts shown in the figure. Note that such a framework is merely provided for illustrative purposes and should not be construed as a limitation. Any number of subscribers may be provided at tiers 102-2 and 102-3 in tiered software framework 200 within the broad scope of the embodiments.

In various embodiments, data 302 may be arranged in data hierarchy 300 for different accounts 304 such that certain users can view and access only a subset of data 302 according to their respective tier 102 and access credentials based on particular needs (e.g., user credentials may indicate which tier 102 and which corresponding accounts 304 are available for access and view). Such accounts 304 may be facilitated by a suitable user interface at frontend 216 for viewing the accessible data. Appropriate user authentication and authorization engines running in backend 214 may ensure that accounts 304 are maintained as desired and appropriate privacy blocks are applied at appropriate tiers 102.

In the example illustrated herein, tier-1 data 302-1 may be of account 304-1; tier-2 data 302-2 may be of accounts 304-2a, 304-2b and 304-2c corresponding to subscribers 104-2a, 104-2b and 104-2c, respectively; tier-3 data 302-3 may be of accounts 304-3a . . . 304-3g corresponding to subscribers 104-3a . . . 104-3g. Subscribers 104-3a . . . 104-3g may access and view their own respective accounts 304-3a . . . 304-3g; however, they cannot access or view other accounts 304 in the same tier 102-3 or in upstream tiers 102-2 or 102-1. Note that accessing and viewing an account refers to accessing and viewing the data of the account. Subscribers 104-2a . . . 104-2c at tier 102-3 may access and view their own respective accounts 304-2a . . . 304-2c as well as downstream accounts 304-3 of their respective subscribers 104-3; however, they cannot access or view other accounts 304-2 in the same tier 102-2, or in downstream tier 102-3 not associated with their downstream subscribers 104-3, or in upstream tier 102-1. For example, subscriber 104-2a may access and view accounts 304-2a, 304-3a, 304-3b, and 304-3c; subscriber 104-2b may access and view accounts 304-2b, 304-3d, and 304-3e; subscriber 104-2c may access and view accounts 304-2c, 304-3f, and 304-3g. Subscriber 104-1 at tier 102-1 may access and view accounts 304-1 at tier 102-1, 304-2a . . . 304-2c at tier 102-2, and 304-3a . . . 304-3g at tier 102-3.

Figure 4:
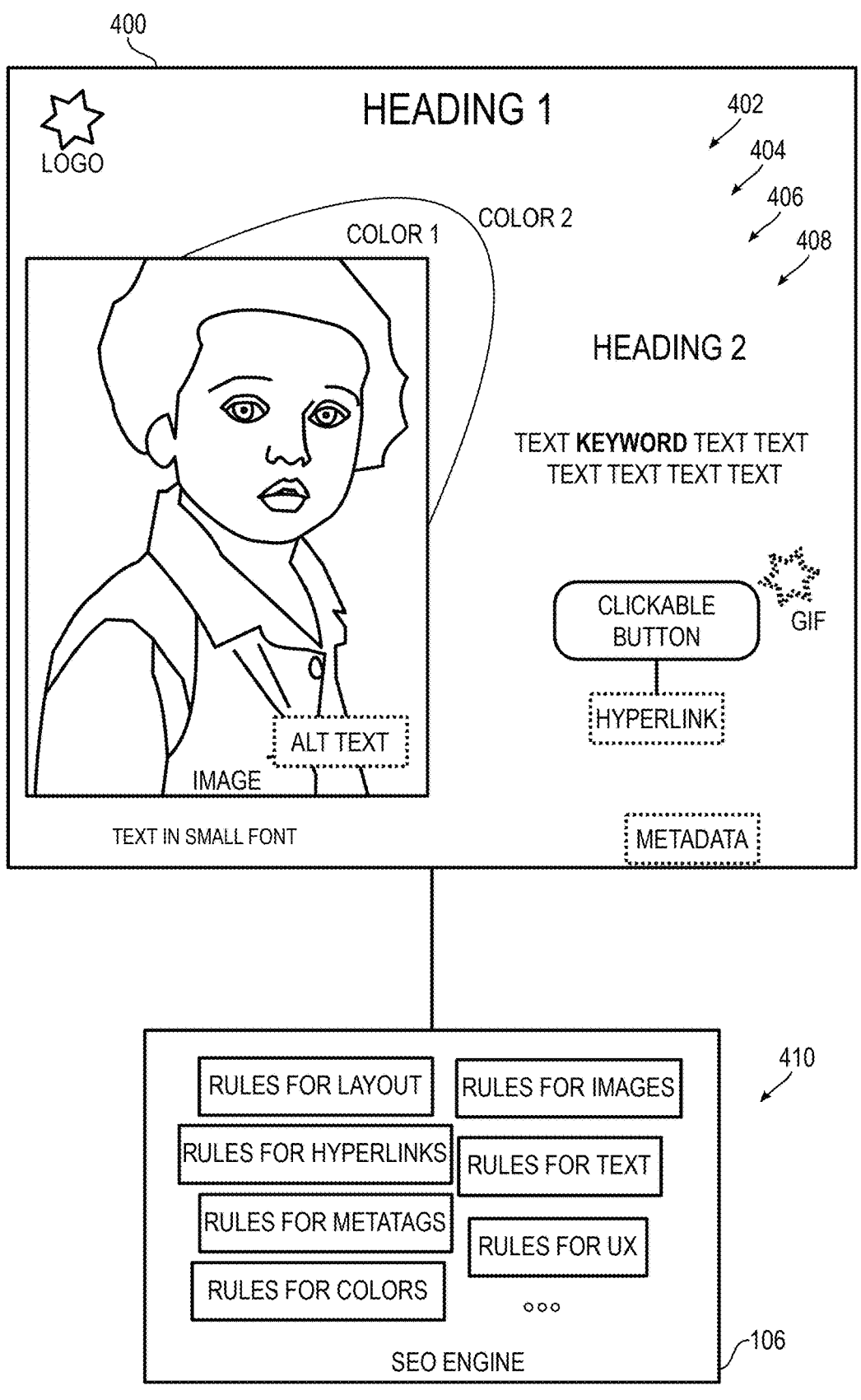
FIG. 4 is a simplified diagram illustrating example details of the funnel website application, according to some embodiments of the present disclosure.

FIG. 4 is a simplified diagram illustrating example details of the funnel website application 100, according to some embodiments of the present disclosure. A webpage 400 comprises various text 402, images 404, and metadata 406. Text 402 may comprise a subset of text data 128; images 404 may comprise a subset of image data 130; and metadata 406 may comprise a subset of business metadata 132 and additional data generated by website generator 108. Each of text 402, images 404 and metadata 406 may be arranged according to a format 408, which includes layout of the webpage, such as placement, location, configuration, etc. of the various elements, type face, character spacing, font size, kerning, user experience (UX) flows, image sizes, colors, image size, and other parameters that affect the way webpage 400 is displayed to a viewer or is indexed by a search engine, or appears in search engine results. For example, some text 402 may be a heading (e.g., heading 1 in a font size of 20 units; heading 2 in a font size of 16 units; etc.); some other text 402 may be body text (e.g., non-bolded in font size of 12 units; etc.) and yet other text 402 may be footer text (e.g., in font size of 8 units; etc.). Some metadata 406 may be characterized as "title" or "heading" while other metadata 406 may be characterized as "hyperlink" and yet other metadata 406 may be characterized as "page description." Some images 404 may comprise a logo, placed at a top portion of webpage 400, while other images 404 may be a photo of relatively large size, placed to capture the viewer's attention, while yet other images 404 may comprise background colors, and other images 404 may be GIFs. Some elements may include combinations of text 402, images 404 and metadata 406, for example, a clickable button having a text label with a hyperlink. Format 408 may be analyzed according to preconfigured rules 410 in SEO engine 106. Rules 410 may include, by way of examples and not as limitations, rules for layout, rules for hyperlinks, rules for metatags, rules for colors, rules for images, rules for text, rules for UX, and so on.

A search engine, such as Google™ or Bing™, may identify the content or context of webpage 400 according to one or more of text 402, images 404, metadata 406 in view of format 408. For example, a pediatric dentist business may display photos of children on its main webpage; a clickable button may take the viewer to another webpage that provides more in-depth description of the dentistry services. By providing suitable metadata 406 on the main webpage that includes information from the in-depth description while remaining invisible to the viewer, webpage 400 may be indexed faster and may appear more prominently in search engine results for "pediatric dentistry" than if metadata 406 were absent. Thus, the combination of text 402, images 404, metadata 406, and format 408 may affect the SEO characteristics of webpage 400. Consequently, preconfigured rules 410 may be tailored to enhance search engine rankings of webpage 400 taking such factors into account.

In yet another example, a website for selling toys may be entirely differently configured from a website that sells financial planning services. Thus, the semantic content of webpage 400, as derived from the content and context of text 402, images 404, and metadata 406 may inform format 408 suitably. These considerations may be ancillary to SEO concerns, but may nevertheless be critical for engaging the viewer, enhancing user experience, and converting visitors to webpage 400 into paying customers. Consequently, preconfigured rules 410 may be tailored to enhance user experience of webpage 400 taking such factors into account. Preconfigured rules 410 may be derived heuristically from past data, industry best practices or other suitable considerations. In various embodiments, preconfigured rules 410 may be used for a first pass analysis of webpage 400. In some example embodiments, results from the first pass analysis may inform semantic recommendations to modify webpage 400 accordingly.

Figure 5:
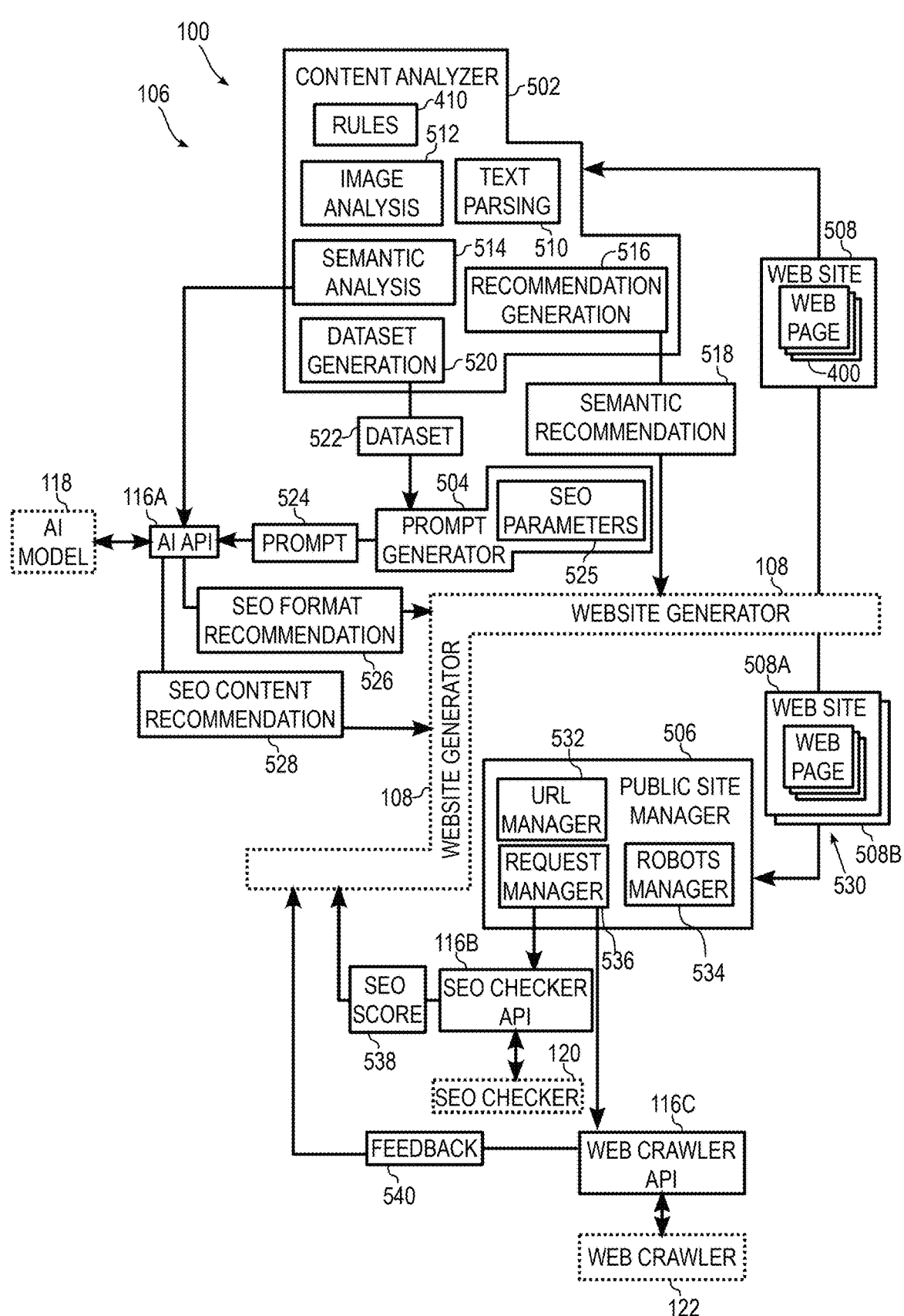
FIG. 5 is a simplified block diagram illustrating other example details of the system for automatic SEO of funnel websites, according to some embodiments of the present disclosure.

FIG. 5 is a simplified block diagram illustrating other example details of funnel website application 100, according to some embodiments of the present disclosure. SEO engine 106 may comprise a content analyzer 502, a prompt generator 504 and a public site manager 506. At the outset, a website 508 comprising one or more interlinked webpages 400 may be provided by website generator 108 to SEO engine 106. Note that website 508 may be a funnel website in some embodiments, with interlinked webpages 400 following one or more UX flows to a specific end. Website 508 provided for the first time (e.g., in an initial step) to SEO engine 106 may be termed as a "seed website" herein. Subsequently, modifications or regenerations of the seed website may be provided to SEO engine 106 as described further below; such modified or regenerated websites are not seed websites as the term is contemplated herein. Content analyzer 502 may analyze website 508 suitably. For example, text parsing 510 may parse text 402 (not shown so as not to crowd the view) and metadata 406 in website 508. Image analysis 512 may process images 404 in website 508 suitably and determine the content and/or context thereof. Semantic analysis 514 of the parsed text (including metadata in the form of text) and analyzed images using rules 410 may inform recommendation generation 516.

In some examples, semantic analysis 514 may be tailored to optimize the internal coherence of website 508 as well as for enhancing search engine rankings of website 508. Semantic analysis 514 may include SEO strategies focused on enabling higher search engine rankings for website 508 by understanding the intent and context of a user's search query. In addition to identifying keywords, semantic analysis 514 may include determining the meaning and relationship between words that are predicted to be used in a search query. In some examples, semantic analysis 514 may leverage AI, NLP, machine learning, latent semantic indexing (LSI) that are natively provisioned in SEO engine 106 or made available through external AI model 118 via AI API

116a. Based on the results of semantic analysis 514, recommendation generation 516 may generate a semantic recommendation 518 to modify website 508. In various embodiments, semantic recommendation 518 may comprise one or more items focused on improving search rankings of website 508 based on semantic searching. Semantic recommendation 518 may be provided to website generator 108.

For example, consider website 508 that markets pediatric dentistry services. Text parsing 510 may identify words in website 508 such as pediatric, dentist, address, heading, title, etc.; image analysis 512 may identify image elements and features, such as smiling child, dentist tools, etc.; Semantic analysis 514 may analyze text, images and metadata of website 508 and understand the type of services being offered, the geographic location, etc. A determination may be made that certain relevant information is missing, for example, ages of patients as well as the phone number for after-office hours. Semantic analysis 514 may also predict a potential user query in a search engine for "my child's gums are red, what should I do?" Semantic recommendation 518 may therefore suggest that ages of patients and phone number for after-office hours be listed in website 508; another item in semantic recommendation 518 may suggest that the content of website 508 should include text and/or images focused on resolving red gums in children based on the semantic SEO prediction of such a query.

Website generator 108 may modify website 508 accordingly. Website 508 may be resent to SEO engine 106 and the operations repeated until a predetermined number of iterations are completed or modifications to website 508 based on semantic recommendation 518 between two consecutive iterations are negligibly small. Dataset generation 520 in content analyzer 502 may thereafter generate a dataset 522 from website 508. Dataset 522 may comprise website 508 in a format that is consumable by AI model 118. Prompt generator 504 may generate a prompt 524 that includes dataset 522 and instructions to AI model 118 to provide SEO recommendations. Prompt 524 may include one or more SEO parameters 525, such as keywords, meta tags, URL structure, quality metrics of content, webpage load speed, mobile-friendliness, backlinks, internal links, image optimization parameters, UX parameters, schema markup, secure sockets layer (SSL) certificates, social signals, site structure, and location information.

Relevant keywords related to the content of a website may be integrated strategically into titles, headings, meta descriptions, and body text. Meta title tags and meta descriptions may accurately reflect the content of each webpage while incorporating targeted keywords. URL structure comprising hyperlinks for each webpage may be descriptive and contain keywords related to its content. Quality metrics focusing on high-quality, original, relevant content and organically integrated relevant keywords may help to increase value to the viewer. Webpage load speed through fast loading times for webpages can improve user experience and search engine rankings. Mobile-friendliness (e.g., website is configured to be responsive and optimized for mobile devices) can enhance search rankings in certain search engines. A diverse portfolio of high-quality backlinks from reputable websites may increase the website's authority and credibility. Internal linking strategies to connect related content within the website can improve navigation and help search engines crawl the website effectively. Image optimization parameters such as descriptive filenames, alt text, and captions can improve accessibility and provide additional context for search engines. UX parameters such as intuitive navigation, clear calls-to-action, and engaging multimedia elements can enhance the website's content. Schema markup can provide search engines with additional context about the content of the website, which can lead to rich snippets in search results. An SSL certificate to encrypt data transmission can improve the website's trustworthiness, which can positively impact search rankings. Social sharing and engagement on social media platforms can increase visibility and potentially improve search engine rankings. Organizing the website's structure in a logical manner can make it easy for users and search engines to navigate through different sections and webpages. Including location information comprising relevant keywords such as address, and phone number can enhance search rankings of location specific searches.

SEO parameters 525 may be preconfigured in prompt generator 504 in some embodiments. Prompt generator 504 may also store therein various requirements of AI model 118. For example, one third-party AI model 118 may have a set of requirements or format for the prompt; another third-party AI model 118 may have a different set of requirements for the prompt. In some embodiments, prompt 524 may comprise a request to a particular AI model 118 specifying SEO parameters 525 or a subset thereof, the request being formatted according to the requirements of AI model 118, and including dataset 522.

Prompt 524 may be sent through AI API 116*a* to AI model 118. In response to prompt 524, AI model 118 may generate one or more SEO recommendations, comprising at least one of SEO format recommendation 526 and SEO content recommendation 528. SEO format recommendation 526 and SEO content recommendation 528 may be provided to website generator 108. Website generator 108 may generate a plurality of websites 530 comprising two or more websites 508 (e.g., 508*a* and 508*b*) based on SEO format recommendation 526 and SEO content recommendation 528. In various embodiments, each website 508 in plurality of websites 530 may be generated from a unique combination of SEO format recommendation 526 and SEO content recommendation 528. For example, website 508*a* may include SEO format recommendation 526 only and website 508*b* may include SEO content recommendation 528 only. In another example, website 508*a* may include two items from SEO format recommendation 526 (e.g., increase font size of heading1, change color1 to color2) and one item from SEO content recommendation 528 (e.g., add keyword1 to body text) whereas website 508*b* may include a different item from SEO format recommendation 526 (e.g., change font type of heading1) and two other items from SEO content recommendation 528 (e.g., add more in-depth description of goods, change image of goods).

Plurality of websites 530 may be provided to public site manager 506 in SEO engine 106. Public site manager 506 may include a URL manager 532, a robots manager 534, and a request manager 536. Robots manager 534 may provision a plurality of URLs for plurality of websites 530, each website 508 being assigned to a different URL. The URLs may be sub-domains of another domain in some embodiments (e.g., www.main_domain/sub_domain). URL manager 532 may deploy (e.g., publish) plurality of websites 530 at the provisioned URLs suitably. Robots manager 534 may modify the robots.txt file of each website 508 in plurality of websites 530 to prevent any web crawler 122 from discovering website 508 and indexing it for search engines.

Request manager 536 may then generate a request to SEO checker 120 for analyzing each website 508 in plurality of websites 530. The request may be provided to SEO checker 120 through SEO checker API 116*b*. In response to the request, SEO checker 120 may analyze each website 508 in plurality of websites 530 and send an SEO score 538 back to SEO engine 106. SEO score 538 of each website 508 may be provided to website generator 108 for further actions.

In some embodiments, request manager 536 may also generate a request to web crawler 122 for analyzing each website 508 in plurality of websites 530. The request may be provided to web crawler 122 through web crawler API 116*c*. In response to the request, web crawler 122 may analyze each website 508 in plurality of websites 530 and send feedback 540 back to SEO engine 106. Feedback 540 of each website 508 may be provided to website generator 108 for further actions.

Figure 6:
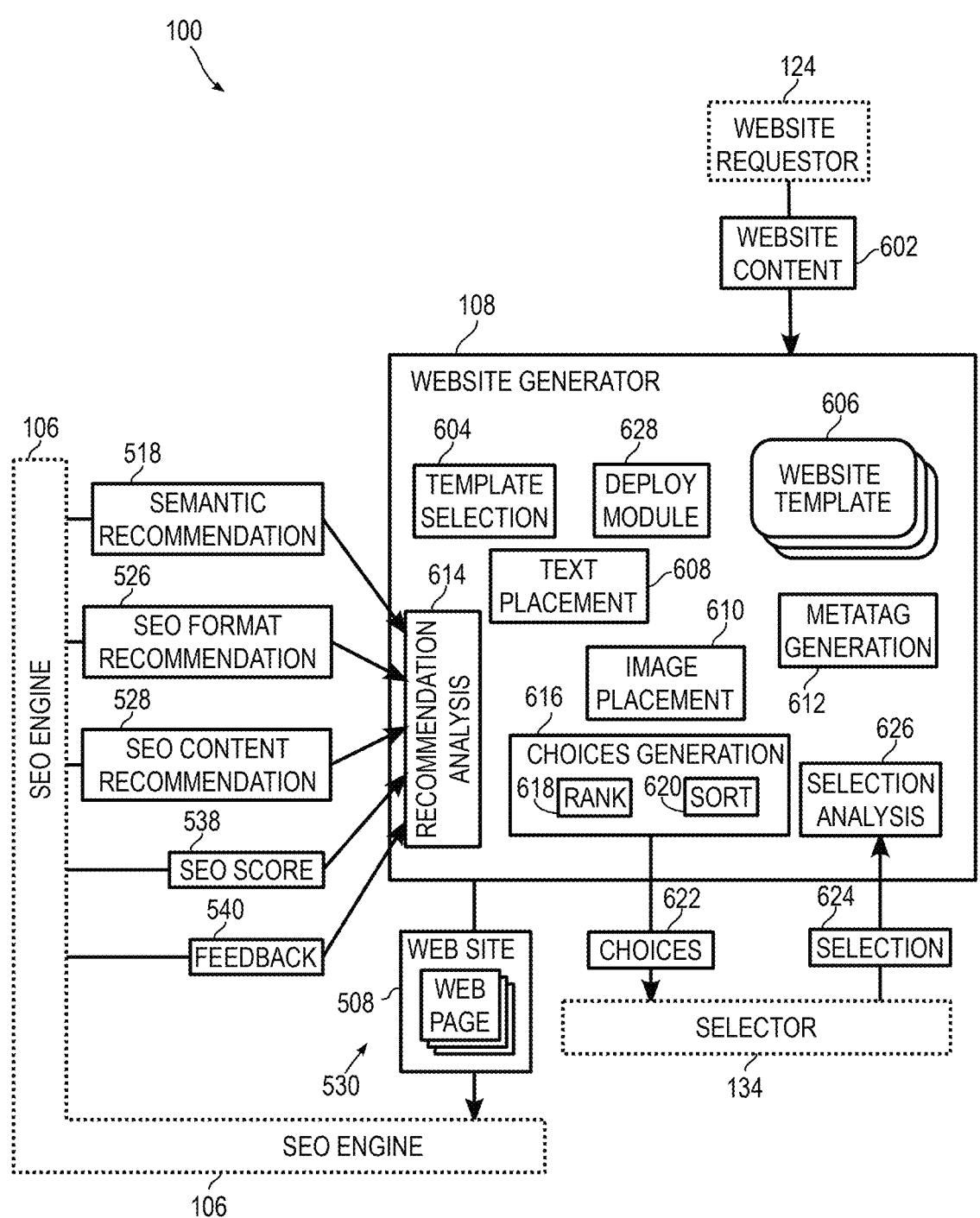
FIG. 6 is a simplified block diagram illustrating yet other example details of the system for automatic SEO of funnel websites, according to some embodiments of the present disclosure.

FIG. 6 is a simplified block diagram illustrating yet other example details of funnel website application 100 according to some embodiments of the present disclosure. Website requestor 124 may provide website content 602 to website generator 108. Website content 602 comprises portions and/or subsets of text data 128, image data 130 and business metadata 132 that is to be included in website 508. Based upon a semantic analysis of the text, images and metadata in website content 602, a template selection 604 may select a website template 606 from a plurality of website templates stored in a template library, for example. In some embodiments, a separate one of website template 606 may be selected for each webpage 400 in website 508. In other embodiments, one website template 606 may include suitable templates for individual webpage 400 in website 508.

Text placement 608 may place text in website content 602 appropriately into the selected one of website template 606. Image placement 610 may place images in website content 602 appropriately into the selected one of website template 606. Based upon the selected one of website template 606, and semantic analysis of website content 602, metatag generation 612 may select additional metadata such as metatags and place them suitably in webpage 400. The generated website 508 including one or more webpage 400 may then be sent to SEO engine 106 for further analysis.

Subsequently, semantic recommendation 518 may be received from SEO engine 106. A recommendation analysis 614 may use semantic recommendation 518 to modify website 508. The modified version of website 508 may be sent to SEO engine 106 and further semantic recommendation 518 received therefrom. The iterations may continue until there is no significant difference between two consecutive versions of website 508 or a predetermined number of iterations are completed.

Subsequently, SEO format recommendation 526 and SEO content recommendation 528 may be received at website generator 108. Recommendation analysis 614 may use SEO format recommendation 526 and SEO content recommendation 528 suitably to generate plurality of websites 530. In various embodiments, each website 508 in plurality of websites 530 may be generated from a unique combination of SEO format recommendation 526 and SEO content recommendation 528. For example, website 508*a* may include SEO format recommendation 526 only and website 508*b* may include SEO content recommendation 528 only. In another example, website 508*a* may include two items from SEO format recommendation 526 (e.g., increase font size of heading1, change color1 to color2) and one item from SEO content recommendation 528 (e.g., add keyword1 to body text) whereas website 508*b* may include a different item from SEO format recommendation 526 (e.g., change font type of heading1) and two other items from SEO content recommendation 528 (e.g., add more in-depth description of goods, change image of goods).

Subsequently, SEO score 538 and feedback 540 may be received from SEO engine 106. A choice generation 616 may associate each of SEO score 538 and feedback 540 with appropriate one of website 508 in plurality of websites 530. Rank 618 and sort 620 may rank and sort website 508 in plurality of websites 530 according to SEO score 538 and/or feedback 540 suitably. A subset of the ranked and sorted websites 508 in plurality of websites 530 may be collected into a choices 622 and presented to selector 134. Selector 134 may return one of the choices as selection 624 to website generator 108. A selection analysis 626 may feed selection 624 to choice generation 616, which may then generate another choices 622, including selection 624 and one or more other ones of the ranked and sorted websites 508. The new choices 622 may be sent to selector 134 and the process continued until a predetermined number of iterations are completed or there is no significant difference between two consecutive selection 624 after a minimum number of iterations are completed.

A deploy module 628 may deploy (e.g., publish) the final selection 624 comprising one of website 508 in plurality of websites 530 at a public URL. Deploying or publishing website 508 comprises making website 508 accessible and viewable publicly. The process may involve putting appropriate website files and content onto a web server with appropriate access credentials. The process may also include registering a domain name, obtaining a web hosting service, configuring domain name system (DNS) settings to point the domain name to the web hosting server, implementing SSL certificates, enabling secure connections, and other tasks that enable website 508 to be accessible to and interactable with the public.

Figure 7:
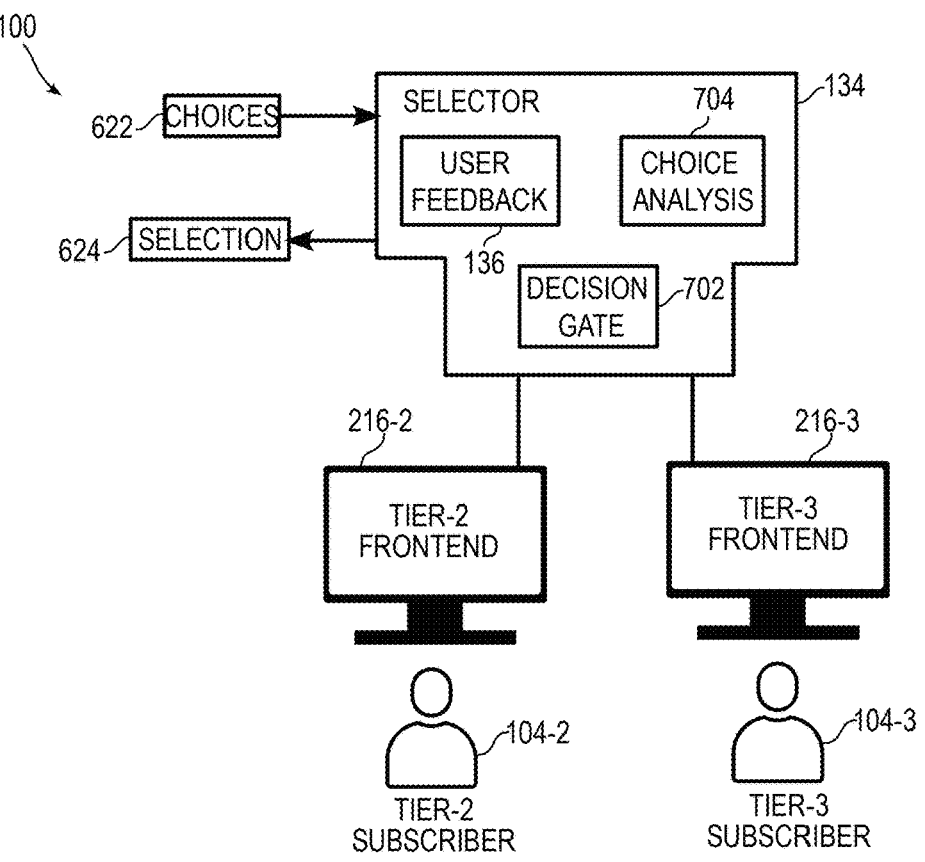
FIG. 7 is a simplified block diagram illustrating yet other example details of the system for automatic SEO of funnel websites, according to some embodiments of the present disclosure.

FIG. 7 is a simplified block diagram illustrating yet other example details of funnel website application 100, according to some embodiments of the present disclosure. Choices 622 may be provided to selector 134. A decision gate 702 in selector 134 may decide whether to send choices 622 to choice analysis 704 or to a user interface in frontend 216-2 at tier 102-2 or frontend 216-3 at tier 102-3 depending on various configuration settings in funnel website application 100. For example, the configuration settings may specify that no website 508 may be deployed publicly unless a human user has reviewed it beforehand. In another example, the configuration settings may specify that any selection 624 must be made by a human user. In yet another example, the configuration settings may specify that only the final selection need be approved by a human user. In some cases, decision gate 702 may decide to send choices 622 to choice analysis 704. Choice analysis 704 may use user feedback 136 to make selection 624, which may then be sent to website generator 108. In another example, decision gate 702 may decide to send choices 622 to frontend 216-2 at tier 102-2. A human user of subscriber 104-2 may then make selection 624. In yet another example, decision gate 702 may decide to send choices 622 to frontend 216-3 at tier 102-3. A human user of subscriber 104-3 may then make selection 624. In some examples, decision gate 702 may send choices 622 to choice analysis 704, frontend 216-2 and frontend 216-3 and return respective selections as selection 624 to website generator 108.

Figures 8A, 8B:
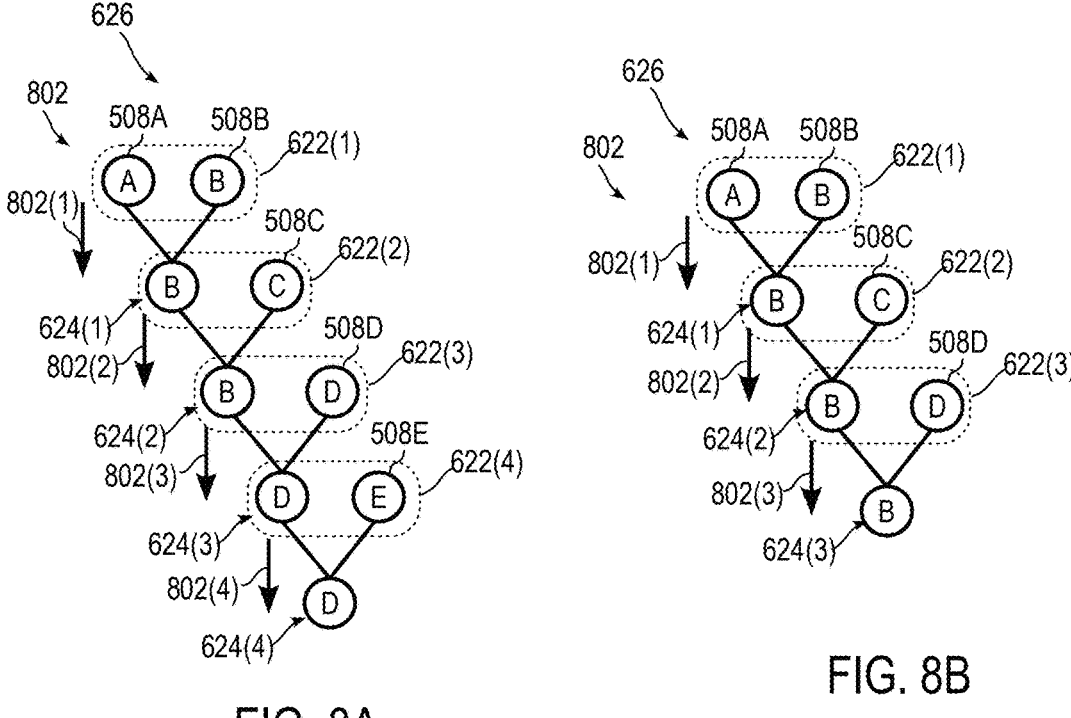
FIGS. 8A and 8B are simplified logical diagrams illustrating yet other example details of the system for automatic SEO of funnel websites, according to some embodiments of the present disclosure.

FIGS. 8A and 8B are simplified logical diagrams illustrating example details of selection analysis 626, according to some embodiments of the present disclosure. Assume, merely for illustrative purposes and not as a limitation, that funnel website application 100 is configured to run a minimum of 2 iterations 802 and a maximum of 4. In both FIGS. 8A and 8B, in first iteration 802(1), first choices 622(1)

consists of website 508a and website 508b, which are the highest two ranked in plurality of websites 530. In FIG. 8A, assume that website 508b is returned as first selection 624(1). Selection analysis 626 may then pick the next ranked in plurality of websites 530, website 508c. Website 508b and website 508c are grouped together into choices 622(2) for second iteration 802(2). Assume that website 508b is returned again as second selection 624(2). Selection analysis 626 may then pick the next ranked in plurality of websites 530, website 508d. Website 508b and website 508d are grouped together into choices 622(3) for third iteration 802(3). Assume that website 508d is returned as third selection 624(3). Selection analysis 626 may then pick the next ranked in plurality of websites 530, website 508e. Website 508e and website 508e are grouped together into choices 622(4) for fourth iteration 802(4). Assume that website 508d is returned as fourth selection 624(4). After the maximum number of iterations 802 is reached, the operations may stop. The final selection, namely fourth selection 624(4) may be the final selection to be deployed publicly.

FIG. 8B shows another alternative analysis. Assume that website 508b is returned as first selection 624(1). Selection analysis 626 may then pick the next ranked in plurality of websites 530, website 508c. Website 508b and website 508c are grouped together into choices 622(2) for second iteration 802(2). Assume that website 508b is returned again as second selection 624(2). Selection analysis 626 may then pick the next ranked in plurality of websites 530, website 508d. Website 508b and website 508d are grouped together into choices 622(3) for third iteration 802(3). Assume that website 508b is returned yet again as third selection 624(3). Now, because the minimum number of iterations 802, namely 2, have been exceeded and selections 624(2) and 624(3) are identical between two consecutive iterations 802(3) and 802(4), the final selection, namely third selection 624(3) may be the final selection to be deployed publicly.

Note that a binary decision tree has been shown for selection analysis 626 in FIGS. 8A and 8B. Such is merely for illustrative purposes and is not meant to be a limitation. Any suitable decision tree approach or other selection processes may be used to generate choices 622, run iterations 802, and make selection 624 within the broad scope of the embodiments.

Although the present disclosure has been described in detail with reference to particular arrangements and configurations, these example configurations and arrangements may be changed significantly without departing from the scope of the present disclosure. For example, although the present disclosure has been described with reference to particular network systems such as cloud networks, funnel website application 100 may be applicable to other networks such as LANs. Moreover, although tiered software framework 200 has been illustrated with reference to particular elements and operations that facilitate the software process, these elements, and operations may be replaced by any suitable architecture or process that achieves the intended functionality of funnel website application 100.

Example Methods

Figure 9:
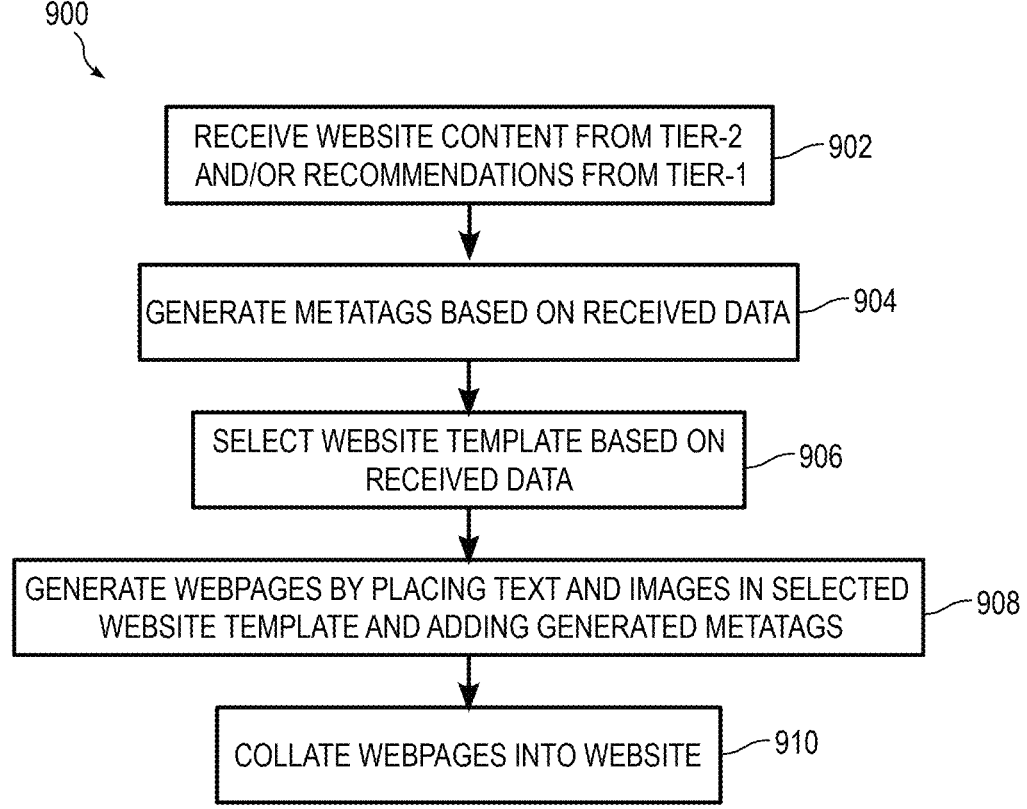
FIG. 9 is a simplified flow diagram illustrating example operations associated with the system for automatic SEO of funnel websites, according to some embodiments of the present disclosure.

FIG. 9 is a simplified flow diagram illustrating example operations 900 associated with generating website 508 in funnel website application 100, according to some embodiments of the present disclosure. At 902, website generator 108 may receive website content 602 from tier 102-2 or recommendations comprising one or more of semantic recommendation 518, SEO format recommendation 526, SEO content recommendation 528, SEO score 538, and feedback 540 from tier 102-1. At 904, website generator 108 may generate metatags based on the received data. Such metatags may include webpage description, titles, headers, hyperlinks, etc. At 906, website template 606 may be selected based on the received data. In some embodiments, 906 may be skipped if website template 606 is not being changed. At 908, webpage 400 may be generated by placing text and images in selected website template 606 and adding generated metatags. At 910, the generated ones of webpage 400 may be collated into website 508.

FIGS. 10A-10C are simplified flow diagrams illustrating example operations 1000 associated with automatic SEO in funnel website application 100, according to some embodiments of the present disclosure. At 1002, website 508 may be received at SEO engine 106. At 1004, parsing and processing of text, images and metadata in website 508 may be performed, for example, to identify words, sentences, features in images, metadata types, etc. At 1006, semantic analysis of the content in website 508 may be performed. At 1008, semantic recommendation 518 may be generated based on the analysis. At 1010, a decision may be made to modify website 508 based on semantic recommendation 518. If yes, at 1012, website 508 may be regenerated based on semantic recommendation 518 suitably. The operations in 1012 may be substantially similar to operations 900 described in FIG. 9. The iterations may continue until a decision is made not to modify website 508. Such decision may be based on a maximum number of iterations preconfigured in funnel website application 100, or when the minimum number of iterations are exceeded and there is no substantial difference between the unmodified website and the modified website between two consecutive iterations.

If it is determined that website 508 is not to be modified further, a further decision may be made at 1014 whether to stop operations. If not, the operations step to 1016, at which dataset 522 may be generated. At 1018, prompt 524 may be generated using dataset 522 and one or more SEO parameters 525. Prompt 524 may be fed to AI model 118 through AI API 116a. At 1020, SEO format recommendation 526 and/or SEO content recommendation 528 may be received from AI model 118. In various embodiments, SEO format recommendation 526 and SEO content recommendation 528 may be generated by AI model 118 from analysis of dataset 522 based on prompt 524. In some embodiments, the operations may step back to 1010, at which a determination may be made whether to modify website 508 based on SEO format recommendation 526 and/or SEO content recommendation 528. In some other embodiments, the operations may step to 1014 and then to 1022.

As shown in FIG. 10B, 1022 continues to 1024, at which unique selections of SEO format recommendation 526 and SEO content recommendation 528 are implemented to generate plurality of websites 530. At 1026, temporary URLs and robots file may be generated for each website 508 in plurality of websites 530. At 1028, a request may be generated to SEO checker 120 requesting to analyze each website 508 in plurality of websites 530 and return SEO score 538. At 1030, each website 508 may be associated with corresponding SEO score 538. In some embodiments, the operations may step to 1036; in other embodiments, the operations may continue to 1032, at which another request may be generated to web crawler 122 requesting to provide feedback 540 on search engine indexing of each website 508 in plurality of websites 530. At 1034, each website 508 may be associated with corresponding feedback 540.

At 1036, a determination may be made whether SEO score 538 and/or feedback 540 are satisfactory. If not, the operations revert to 1018, at which prompt 524 may be regenerated for further SEO analysis. The regenerated prompt 524 may specify different SEO parameters 525 than original prompt 524. For example, SEO parameters 525 specified in the original prompt 524 may include: keywords, metatags and image optimization parameters (i.e., prompt 524 may request AI model 118 to provide SEO format recommendation 526 and SEO content recommendation 528 focused on keywords, metatags and image optimization parameters). SEO parameters 525 in the regenerated prompt 524 may include hyperlinks, and quality metrics of content (i.e., regenerated prompt 524 may request AI model 118 to provide SEO format recommendation 526 and SEO content recommendation 528 focused on hyperlinks, and quality metrics of content). In some embodiments, the regeneration may be based on information gathered from SEO score 538 and/or feedback 540. In some embodiments, dataset 522 may also be regenerated with the content and format of the website having the low SEO score and/or feedback. If SEO score 538 and/or feedback 540 are satisfactory, the operations continue to 1038, at which plurality of websites 530 is received and collected together with associated SEO score 538 and/or feedback 540. The operations continue to 1040 in FIG. 10C.

As shown in FIG. 10C, at 1042, choices 622 may be generated based on one or more of SEO score 538 and/or feedback 540. In some embodiments, choices 622 may comprise a pair from plurality of websites 530 selected based on their respective ranks of SEO score 538 and/or feedback 540. At 1044, choices 622 may be sent to tier 102-2. At 1046, selection 624 may be received at website generator 108 from tier 102-2. At 1048, a determination may be made whether selection 624 is same as in immediately preceding iteration. If yes, a determination may be made at 1050 whether the number of iterations 802 is less than a preconfigured minimum. If yes, the operations step to 1052, at which choices 622 may be regenerated and the operations may continue to 1042. Note that when choices 622 is regenerated, selection 624 is one in choices 622 along with another website 508 based on ranked SEO score 538 and/or feedback 540.

At 1050, if the minimum number of iterations 802 is exceeded (and selection 624 is same as in previous iteration), the operations step to 1054, at which the last selection 624 is deployed at a public URL. On the other hand, stepping back to 1048, if selection 624 is not the same as in the previous iteration, the operations may continue to 1056, at which a determination may be made whether a preconfigured maximum number of iterations 802 has been exceeded. If yes, the operations step to 1054, and if not, the operations continue to 1052.

Figure 11:
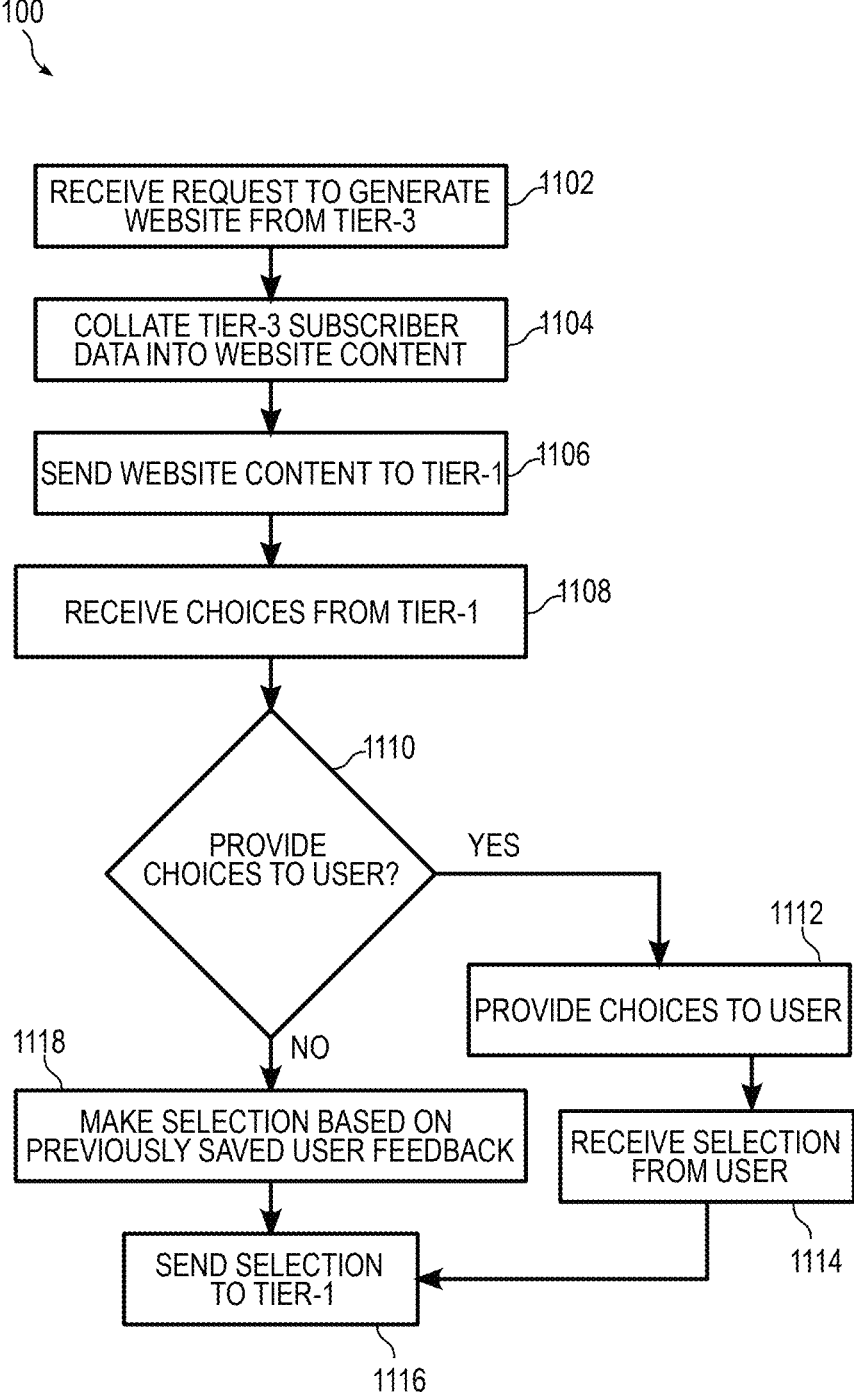
FIG. 11 is a simplified flow diagram illustrating yet other example operations associated with the system for automatic SEO of funnel websites, according to some embodiments of the present disclosure.

FIG. 11 is a simplified flow diagram illustrating example operations 1100 associated with tier 102-2 in funnel website application 100, according to some embodiments of the present disclosure. At 1102, website request 126 from subscriber 104-3a in tier 102-3 may be received at tier 102-2. At 1104, text data 128, image data 130 and business metadata 132 associated with subscriber 104-3a may be collated into website content 602. At 1106, website content 602 may be sent to tier 102-1. At 1108, choices 622 may be received from tier 102-1. At 1110, a determination may be made whether to provide choices 622 to a human user. If yes, the operations step to 1112, at which choices 622 may be provided to one or more of subscriber 104-2a and subscriber 104-3a suitably, for example, on frontend 216-2 and frontend 216-3, respectively. At 1114, selection 624 may be received from the human user. At 1116, selection 624 may be sent to tier 102-1. On the other hand, at 1110, the determination may be made not to provide choices 622 to the user. The operations then step to 1118, at which selection 624 is made based on previously saved user feedback 136.

In various embodiments, substantially most operations described in FIGS. 9-11 are performed automatically without human intervention. Although FIGS. 9-11 illustrate various operations performed in a particular order, this is simply illustrative, and the operations discussed herein may be reordered and/or repeated as suitable. Further, additional operations which are not illustrated may also be performed without departing from the scope of the present disclosure. Also, various ones of the operations discussed herein with respect to FIGS. 9-11 may be modified in accordance with the present disclosure to automatically generate website 508 with SEO as disclosed herein. Although various operations are illustrated in FIGS. 9-11 once each, the operations may be repeated as often as desired.

It is important to note that the operations described with reference to the preceding figures illustrate only some of the possible scenarios that may be executed by, or within, funnel website application 100. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion.

SELECT EXAMPLES

Example 1 provides a method for automatically generating websites optimized for search engines in a tiered software framework. The method is executed by a software application with a portion executed in a first tier of the tiered software framework and another portion executed in a second tier. The method comprises: generating a prompt to be used by an AI model to provide recommendations for improving search rankings of a seed website; receiving from the AI model, a first SEO recommendation for modifying format of the seed website, and a second SEO recommendation for modifying content of the seed website; generating a plurality of websites, each one in the plurality of websites generated by modifying the seed website according to a unique selection from the first SEO recommendation and the second SEO recommendation; associating each one in the plurality of websites with a corresponding SEO score based on performance in a web search; ranking and sorting the plurality of websites according to the respective SEO scores; iteratively generating choices, providing the choices to the second tier, and receiving from the second tier a selection from among the choices for a predetermined number of iterations, or until selections from two consecutive iterations are identical; and deploying the selection from a final iteration at a public URL. Data in a portion of the seed website is retrieved from a second tier of the tiered software framework, with data access from the first tier to the second tier following a one-to-many relationship among subscriber accounts thereof. The AI model generates the first SEO recommendation and the second SEO recommendation responsive to the prompt. The choices comprise a subset in the plurality of websites according to ranked SEO scores, and for iterations after a first iteration, the choices in a current iteration include the selection from an immediately preceding iteration.

Example 2 provides the method of example 1, further comprising: determining that the SEO score of one in the plurality of websites is below a predetermined threshold; and generating another prompt in response. The prompt specifies one or more SEO parameters for the recommendations, and the other prompt specifies different SEO parameters than the prompt.

Example 3 provides the method of any one of examples 1-2, in which the seed website and the plurality of websites include at least one webpage comprising text, images, and metatags configured according to a format.

Example 4 provides the method of example 3, in which the webpages include data associated with a particular subscriber account in the third tier of the tiered software framework.

Example 5 provides the method of any one of examples 1-4, in which generating the prompt comprises: generating a dataset comprising the text, images, metadata and format of the seed website; retrieving preconfigured SEO parameters of interest; identifying requirements for the AI model; and generating the prompt comprising a request to the AI model specifying the SEO parameters of interest according to the requirements and including the dataset.

Example 6 provides the method of any one of examples 1-5, in which associating each one in the plurality of websites with a corresponding SEO score comprises: publishing each one in the plurality of websites at respective URLs; generating a request to one or more SEO checkers for rating each one in the plurality of websites according to performance in a web search; and receiving from the one or more SEO checkers the SEO scores of each one in the plurality of websites.

Example 7 provides the method of any one of examples 1-6, further comprising modifying a robots.txt file of each one in the plurality of websites to specify no indexing by web crawlers.

Example 8 provides non-transitory computer-readable tangible media includes instructions for execution, which when executed by a processor of a computing device, is operable to perform various operations. The operations are executed in a tiered software framework, with a subset executed in the first tier and another subset executed in the second tier. The operations comprise: generating a prompt to be used by an AI model to provide recommendations for improving search rankings of a seed website; receiving from the AI model, a first SEO recommendation for modifying format of the seed website, and a second SEO recommendation for modifying content of the seed website; generating a plurality of websites, each one in the plurality of websites generated by modifying the seed website according to a unique selection from the first SEO recommendation and the second SEO recommendation; associating each one in the plurality of websites with a corresponding SEO score based on performance in a web search; ranking and sorting the plurality of websites according to the respective SEO scores; iteratively generating choices, providing the choices to the second tier, and receiving from the second tier a selection from among the choices for a predetermined number of iterations, or until selections from two consecutive iterations are identical; and deploying the selection from a final iteration at a public URL. Data in a portion of the seed website is retrieved from a second tier of the tiered software framework, with data access from the first tier to the second tier following a one-to-many relationship among subscriber accounts thereof. The AI model generates the first SEO recommendation and the second SEO recommendation responsive to the prompt. The choices comprise a subset in the plurality of websites according to ranked SEO scores, and for iterations after a first iteration, the choices in a current iteration include the selection from an immediately preceding iteration.

Example 9 provides the non-transitory computer-readable tangible media of example 8, in which the operations further comprise: determining that the SEO score of one in the plurality of websites is below a predetermined threshold; and generating another prompt in response. The prompt specifies one or more SEO parameters for the recommendations, and the other prompt specifies different SEO parameters than the prompt.

Example 10 provides the non-transitory computer-readable tangible media of any one of examples 8-9, in which the seed website and the plurality of websites include at least one webpage comprising text, images, and metatags configured according to a format.

Example 11 provides the non-transitory computer-readable tangible media of example 10, in which the webpages include data associated with a particular subscriber account in the third tier of the tiered software framework.

Example 12 provides the non-transitory computer-readable tangible media of any one of examples 8-11, in which generating the prompt comprises: generating a dataset comprising the text, images, metadata and format of the seed website; retrieving preconfigured SEO parameters of interest; identifying requirements for the AI model; and generating the prompt comprising a request to the AI model specifying the SEO parameters of interest according to the requirements and including the dataset.

Example 13 provides the non-transitory computer-readable tangible media of any one of examples 8-12, in which associating each one in the plurality of websites with a corresponding SEO score comprises: publishing each one in the plurality of websites at respective URLs; generating a request to one or more SEO checkers for rating each one in the plurality of websites according to performance in a web search; and receiving from the one or more SEO checkers the SEO scores of each one in the plurality of websites.

Example 14 provides the non-transitory computer-readable tangible media of any one of examples 8-13, in which the operations further comprise modifying a robots.txt file of each one in the plurality of websites to specify no indexing by web crawlers.

Example 15 provides an apparatus comprising: a processing circuitry; a memory storing data; and a communication circuitry, in which the processing circuitry executes instructions associated with the data, the processing circuitry is coupled to the communication circuitry and the memory, and the processing circuitry and the memory cooperate, such that the apparatus is configured for executing the instructions in a tiered software framework, with a subset of the instructions executed in the first tier and another subset executed in the second tier. The apparatus is configured for: generating a prompt to be used by an AI model to provide recommendations for improving search rankings of a seed website; receiving from the AI model, a first SEO recommendation for modifying format of the seed website, and a second SEO recommendation for modifying content of the seed website; generating a plurality of websites, each one in the plurality of websites generated by modifying the seed website according to a unique selection from the first SEO recommendation and the second SEO recommendation; associating each one in the plurality of websites with a corresponding SEO score based on performance in a web search; ranking and sorting the plurality of websites according to the respective SEO scores; iteratively generating choices, providing the choices to the second tier, and receiving from the second tier a selection from among the choices for a predetermined number of iterations, or until selections from two consecutive iterations are identical; and deploying the selection from a final iteration at a public URL. The instructions are carried out in the first tier of the tiered software framework. Data in a portion of the seed website is retrieved from a second tier of the tiered software framework, with data access from the first tier to the second tier following a one-to-many relationship among subscriber accounts thereof. The AI model generates the first SEO recommendation and the second SEO recommendation responsive to the prompt. The choices comprise a subset in the plurality of websites according to ranked SEO scores, and for iterations after a first iteration, the choices in a current iteration include the selection from an immediately preceding iteration.

Example 16 provides the apparatus of example 15, further configured for: determining that the SEO score of one in the plurality of websites is below a predetermined threshold; and generating another prompt in response. The prompt specifies one or more SEO parameters for the recommendations, and the other prompt specifies different SEO parameters than the prompt.

Example 17 provides the apparatus of any one of examples 15-16, om which the seed website and the plurality of websites include at least one webpage comprising text, images, and metatags configured according to a format.

Example 18 provides the apparatus of example 17, in which the webpages include data associated with a particular subscriber account in the third tier of the tiered software framework.

Example 19 provides the apparatus of any one of examples 15-18, in which generating the prompt comprises: generating a dataset comprising the text, images, metadata and format of the seed website; retrieving preconfigured SEO parameters of interest; identifying requirements for the AI model; and generating the prompt comprising a request to the AI model specifying the SEO parameters of interest according to the requirements and including the dataset.

Example 20 provides the apparatus of any one of examples 15-19, in which associating each one in the plurality of websites with a corresponding SEO score comprises: publishing each one in the plurality of websites at respective URLs; generating a request to one or more SEO checkers for rating each one in the plurality of websites according to performance in a web search; and receiving from the one or more SEO checkers the SEO scores of each one in the plurality of websites.

The above description of illustrated implementations of the disclosure, including what is described in the abstract, is not intended to be exhaustive or to limit the disclosure to the precise forms disclosed. While specific implementations of, and examples for, the disclosure are described herein for illustrative purposes, various equivalent modifications are possible within the scope of the disclosure, as those skilled in the relevant art will recognize.

The invention claimed is:

1. A method for automatically generating websites optimized for search engines in a tiered software framework, the method executed by a software application, the method comprising:

generating a prompt to be used by an artificial intelligence (AI) model to provide recommendations for improving search rankings of a seed website, wherein:

a portion of the method is executed in a first tier of the tiered software framework, and another portion of the method is executed in a second tier of the tiered software framework, data in a portion of the seed website is retrieved from a second tier of the tiered software framework, and data access from the first tier to the second tier follows a one-to-many relationship among subscriber accounts thereof;

receiving from the AI model, a first search engine optimization (SEO) recommendation for modifying format of the seed website, and a second SEO recommendation for modifying content of the seed website, wherein the AI model generates the first SEO recommendation and the second SEO recommendation responsive to the prompt;

generating a plurality of websites, each one in the plurality of websites generated by modifying the seed website according to a unique selection from the first SEO recommendation and the second SEO recommendation;

associating each one in the plurality of websites with a corresponding SEO score based on performance in a web search;

ranking and sorting the plurality of websites according to the respective SEO scores;

iteratively generating choices, providing the choices to the second tier, and receiving from the second tier a selection from among the choices for a predetermined number of iterations, or until selections from two consecutive iterations are identical, wherein:

the choices comprise a subset in the plurality of websites according to ranked SEO scores, and for iterations after a first iteration, the choices in a current iteration include the selection from an immediately preceding iteration; and deploying the selection from a final iteration at a public uniform resource locator (URL).

2. The method of claim 1, further comprising:

determining that the SEO score of one in the plurality of websites is below a predetermined threshold; and generating another prompt in response to the determining, wherein:

the prompt specifies one or more SEO parameters for the recommendations, and the another prompt specifies different SEO parameters than the prompt.

3. The method of claim 1, wherein the seed website and the plurality of websites include at least one webpage comprising text, images, and metatags configured according to a format.

4. The method of claim 3, wherein the at least one webpage includes data associated with a particular subscriber account in a third tier of the tiered software framework.

5. The method of claim 1, wherein generating the prompt comprises:

generating a dataset comprising text, images, metadata and format of the seed website;

retrieving preconfigured SEO parameters of interest;

identifying requirements for the AI model; and generating the prompt comprising a request to the AI model specifying the SEO parameters of interest according to the requirements and including the dataset.

6. The method of claim 1, wherein associating each one in the plurality of websites with a corresponding SEO score comprises:

publishing each one in the plurality of websites at respective URLs;

generating a request to one or more SEO checkers for rating each one in the plurality of websites according to performance in a web search; and receiving from the one or more SEO checkers the SEO scores of each one in the plurality of websites.

7. The method of claim 1, further comprising modifying a robots.txt file of each one in the plurality of websites to specify no indexing by web crawlers.

8. Non-transitory computer-readable tangible media that includes instructions for execution, which when executed by a processor of a computing device, is operable to perform operations comprising:

generating a prompt to be used by an artificial intelligence (AI) model to provide recommendations for improving search rankings of a seed website, wherein:

a subset of the operations is executed in a first tier of a tiered software framework, and another subset of the operations is executed in a second tier of the tiered software framework, data in a portion of the seed website is retrieved from a second tier of the tiered software framework, and data access from the first tier to the second tier follows a one-to-many relationship among subscriber accounts thereof;

receiving from the AI model, a first search engine optimization (SEO) recommendation for modifying format of the seed website, and a second SEO recommendation for modifying content of the seed website, wherein the AI model generates the first SEO recommendation and the second SEO recommendation responsive to the prompt;

generating a plurality of websites, each one in the plurality of websites generated by modifying the seed website according to a unique selection from the first SEO recommendation and the second SEO recommendation;

associating each one in the plurality of websites with a corresponding SEO score based on performance in a web search;

ranking and sorting the plurality of websites according to the respective SEO scores;

iteratively generating choices, providing the choices to the second tier, and receiving from the second tier a selection from among the choices for a predetermined number of iterations, or until selections from two consecutive iterations are identical, wherein:

the choices comprise a subset in the plurality of websites according to ranked SEO scores, and for iterations after a first iteration, the choices in a current iteration include the selection from an immediately preceding iteration; and deploying the selection from a final iteration at a public uniform resource locator (URL).

9. The non-transitory computer-readable tangible media of claim 8, wherein the operations further comprise:

determining that the SEO score of one in the plurality of websites is below a predetermined threshold; and generating another prompt in response to the determining, wherein:

the prompt specifies one or more SEO parameters for the recommendations, and the another prompt specifies different SEO parameters than the prompt.

10. The non-transitory computer-readable tangible media of claim 8, wherein the seed website and the plurality of websites include at least one webpage comprising text, images, and metatags configured according to a format.

11. The non-transitory computer-readable tangible media of claim 10, wherein the at least one webpage includes data associated with a particular subscriber account in a third tier of the tiered software framework.

12. The non-transitory computer-readable tangible media of claim 8, wherein generating the prompt comprises:

generating a dataset comprising text, images, metadata and format of the seed website;

retrieving preconfigured SEO parameters of interest;

identifying requirements for the AI model; and generating the prompt comprising a request to the AI model specifying the SEO parameters of interest according to the requirements and including the dataset.

13. The non-transitory computer-readable tangible media of claim 8, wherein associating each one in the plurality of websites with a corresponding SEO score comprises:

publishing each one in the plurality of websites at respective URLs;

generating a request to one or more SEO checkers for rating each one in the plurality of websites according to performance in a web search; and receiving from the one or more SEO checkers the SEO scores of each one in the plurality of websites.

14. The non-transitory computer-readable tangible media of claim 8, wherein the operations further comprise modifying a robots.txt file of each one in the plurality of websites to specify no indexing by web crawlers.

15. An apparatus comprising:

a processing circuitry;

a memory storing data; and a communication circuitry, wherein the processing circuitry executes instructions associated with the data, the processing circuitry is coupled to the communication circuitry and the memory, and the processing circuitry and the memory cooperate, such that the apparatus is configured for:

generating a prompt to be used by an artificial intelligence (AI) model to provide recommendations for improving search rankings of a seed website, wherein:

a subset of the instructions is executed in a first tier of a tiered software framework, and another subset of the instructions is executed in a second tier of the tiered software framework, data in a portion of the seed website is retrieved from a second tier of the tiered software framework, and data access from the first tier to the second tier follows a one-to-many relationship among subscriber accounts thereof;

receiving from the AI model, a first search engine optimization (SEO) recommendation for modifying format of the seed website, and a second SEO recommendation for modifying content of the seed website, wherein the AI model generates the first SEO recommendation and the second SEO recommendation responsive to the prompt;

generating a plurality of websites, each one in the plurality of websites generated by modifying the seed website according to a unique selection from the first SEO recommendation and the second SEO recommendation;

associating each one in the plurality of websites with a corresponding SEO score based on performance in a web search;

ranking and sorting the plurality of websites according to the respective SEO scores;

iteratively generating choices, providing the choices to the second tier, and receiving from the second tier a selection from among the choices for a predetermined number of iterations, or until selections from two consecutive iterations are identical, wherein:

the choices comprise a subset in the plurality of websites according to ranked SEO scores, and for iterations after a first iteration, the choices in a current iteration include the selection from an immediately preceding iteration; and deploying the selection from a final iteration at a public uniform resource locator (URL).

16. The apparatus of claim 15, further configured for:

determining that the SEO score of one in the plurality of websites is below a predetermined threshold; and generating another prompt in response to the determining, wherein:

the prompt specifies one or more SEO parameters for the recommendations, and the another prompt specifies different SEO parameters than the prompt.

17. The apparatus of claim 15, wherein the seed website and the plurality of websites include at least one webpage comprising text, images, and metatags configured according to a format.

18. The apparatus of claim 17, wherein the at least one webpage includes data associated with a particular subscriber account in a third tier of the tiered software framework.

19. The apparatus of claim 15, wherein generating the prompt comprises:

generating a dataset comprising text, images, metadata and format of the seed website;

retrieving preconfigured SEO parameters of interest;

identifying requirements for the AI model; and generating the prompt comprising a request to the AI model specifying the SEO parameters of interest according to the requirements and including the dataset.

20. The apparatus of claim 15, wherein associating each one in the plurality of websites with a corresponding SEO score comprises:

publishing each one in the plurality of websites at respective URLs;

generating a request to one or more SEO checkers for rating each one in the plurality of websites according to performance in a web search; and receiving from the one or more SEO checkers the SEO scores of each one in the plurality of websites.

\* \* \* \* \*